(12) United States Patent
Pham et al.

(10) Patent No.: US 12,375,660 B2
(45) Date of Patent: Jul. 29, 2025

(54) TECHNIQUES FOR CONTOURING/BANDING ARTIFACT REMOVAL IN COMPRESSED IMAGE/VIDEO

(71) Applicant: APPLE INC., Cupertino, CA (US)

(72) Inventors: Van Luong Pham, San Diego, CA (US); Arash Vosoughi, San Jose, CA (US); Dzung T Hoang, Morgan Hill, CA (US); Linfeng Guo, Cupertino, CA (US); Alican Nalci, Cupertino, CA (US); Guichun Li, San Jose, CA (US); Hilmi Enes Egilmez, Santa Clara, CA (US); Alexandros Tourapis, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/610,737

(22) Filed: Mar. 20, 2024

(65) Prior Publication Data
US 2025/0142059 A1    May 1, 2025

Related U.S. Application Data

(60) Provisional application No. 63/599,211, filed on Nov. 15, 2023, provisional application No. 63/595,142, filed on Nov. 1, 2023.

(51) Int. Cl.
*H04N 7/12* (2006.01)
*H04N 19/117* (2014.01)
*H04N 19/14* (2014.01)
*H04N 19/176* (2014.01)
(Continued)

(52) U.S. Cl.
CPC .......... *H04N 19/117* (2014.11); *H04N 19/14* (2014.11); *H04N 19/176* (2014.11); *H04N 19/198* (2014.11); *H04N 19/82* (2014.11)

(58) Field of Classification Search
CPC .................................................. H04N 19/117
See application file for complete search history.

(56) References Cited

PUBLICATIONS

Sole et al.; "CAMBI, a banding artifact detector"; https://netflixtechblog.com/cambi-a-banding-artifact-detector-96777ae12fe2; Netflix; Oct. 2021; accessed Mar. 22, 2024; 15 pages.

(Continued)

*Primary Examiner* — Young Lee
(74) *Attorney, Agent, or Firm* — BakerHostetler

(57) ABSTRACT

Low complexity, hardware-friendly techniques are proposed for video coding systems to mitigate banding artifacts while maintaining the compression efficiency. In general, the proposed techniques consist of two stages including a banding detection stage and a de-banding stage. The banding detection stage may identify the image/video regions where the banding artifact may be present based on gradient information and other information. The de-banding stage may apply corrective techniques to regions identified as likely to possess banding artifacts. In one embodiment, the de-banding adapts the filtering logic proposed by prior video coding standards for other filtering applications to mitigate banding. When implemented over the AV1 video coding standard and the AOM Video Model (AVM) reference software, the proposed technique improves subjective quality significantly at a reasonable hardware implementation cost. The methods and embodiments presented in this document can be beneficial find application in a wide variety of image/video coding standards and systems.

32 Claims, 25 Drawing Sheets

(51) Int. Cl.
  *H04N 19/196* (2014.01)
  *H04N 19/82* (2014.01)

(56) References Cited

PUBLICATIONS de Rivaz et al.; "AV1 Bistream & Decoding Process Specification"; https://aomediacodec.github.io/av1-spec/av1-spec.pdf; The Alliance for Open Media; Jan. 2019; accessed Mar. 22, 2024; 681 pages.
Mukherjee et al.; "A Switchable Loop-Restoration with Side-Information Framework for the Emerging AV1 Video Codec"; IEEE Int'l Conf. Image Processing; 2017; p. 265-269.
Midtskogen et al.; "The AV1 Constrained Directional Enhancement Filter (CDEF)"; IEEE Int'l Conf. on Acoustics, Speech and Signal Processing; 2018; p. 1193-1197.
Casali et al.; "Adaptive Quantisation in HEVC for Contouring Artefacts Removal in UHD Content"; IEEE Int'l Conf. Image Processing; 2015; p. 2577-2581.
Bhagavathy et al.; "Multiscale Probabilistic Dithering for Suppressing Contour Artifacts in Digital Images"; IEEE Transactions on Image Processing; vol. 18 No. 9; Sep. 2009; p. 1936-1945.
Joy et al.; "Reducing False Contours in Quantized Color Images"; Computer & Graphics; vol. 20 No. 2; 1996; p. 231-242.
Bross et al.; "Overview of the Versatile Video Coding (VVC) Standard and Its Applications"; IEEE Transactions on Circuits and Systems for Video Technology; vol. 31 No. 10; Oct. 2021; p. 3736-3764.
Ahn et al.; "Flat-Region Detection and False Contour Removal in the Digital TV Display"; IEEE Int'l Conf. Multimedia Expo; 2005; p. 1338-1341.
Huang et al.; "Understanding and Removal of False Contour in HEVC Compressed Images"; IEEE Transactions on Circuits and Systems for Video Technology; vol. 28 No. 2; Feb. 2018; p. 378-391.
Yoo et al.; "In-loop selective processing for contour artefact reduction in video coding"; Electronic Letters; vol. 45 No. 20; Sep. 2009; p. 1020-1022.
L. Roberts; "Picture Coding Using Pseudo-Random Noise"; IRE Transactions on Information Theory; vol. 8 No. 2; 1962; p. 145-154.
Choi et al.; "False Contour Reduction Using Directional Dilation and Edge-Preserving Filtering"; IEEE Transactions Consumer Electronics; vol. 52; 2006; p. 1099-1106.
Sullivan et al.; "Overview of the High Efficiency Video Coding (HEVC) Standard"; IEEE Transactions on Circuits and Systems for Video Technology; vol. 22 No. 12; Dec. 2012; p. 1649-1668.
Wiegand et al.; "Overview of the H.264/AVC Video Coding Standard"; IEEE Transactions on Circuits and Systems for Video Technology; vol. 13 No. 7; Jul. 2003; p. 560-576.
Han et al.; "A Technical Overview of AV1"; Proceedings of the IEEE; vol. 109 No. 9; Sep. 2021; p. 1435-1462.
Baugh et al.; "Advanced Video Debanding"; European Conf. Visual Media Prod .; 2014; 10 pages.
Lee et al.; "Two-Stage False Contour Detection Using Directional Contrast Features and Its Application to Adaptive False Contour Reduction"; IEEE Transaction Consumer Electronics; vol. 52; 2006; p. 179-188.
Daly et al.; "Decontouring: prevention and removal of false contour artifacts"; SPIE Human Vision Electron Image; vol. 5292; 2004; p. 130-149.
Jose Sole, et al., A debanding filter for AVM, Alliance for Open Media, Codec Working Group, Nov. 14, 2022, CWG-C062_v4.
Andrey Norkin, Banding prevention in AVM, Alliance for Open Media, Codec Working Group, Oct. 3, 2023, CWG-D131_v1.
Ramzi Khsib, CWG-D135: AV2 Banding in 10 Bits SDR Investigations and Recommendations, 2023 AWS, AOM AV2: FG9.
Onur Guleryuz, et al., Extensions to Loop-Restoration (LR), Alliance for Open Media, Codec Working Group, Dec. 16, 2022, CWG-C016_v9.
Yao-Jen Chang et al., Compression efficiency methods beyond VVC, Joint Experts Team (JVET) of ITU-T SG 16 WP 3 and ISO/IEC JTC1/SC 29, 21st Meeting, by teleconference, Jan. 6-15, 2021, JVET U0100.

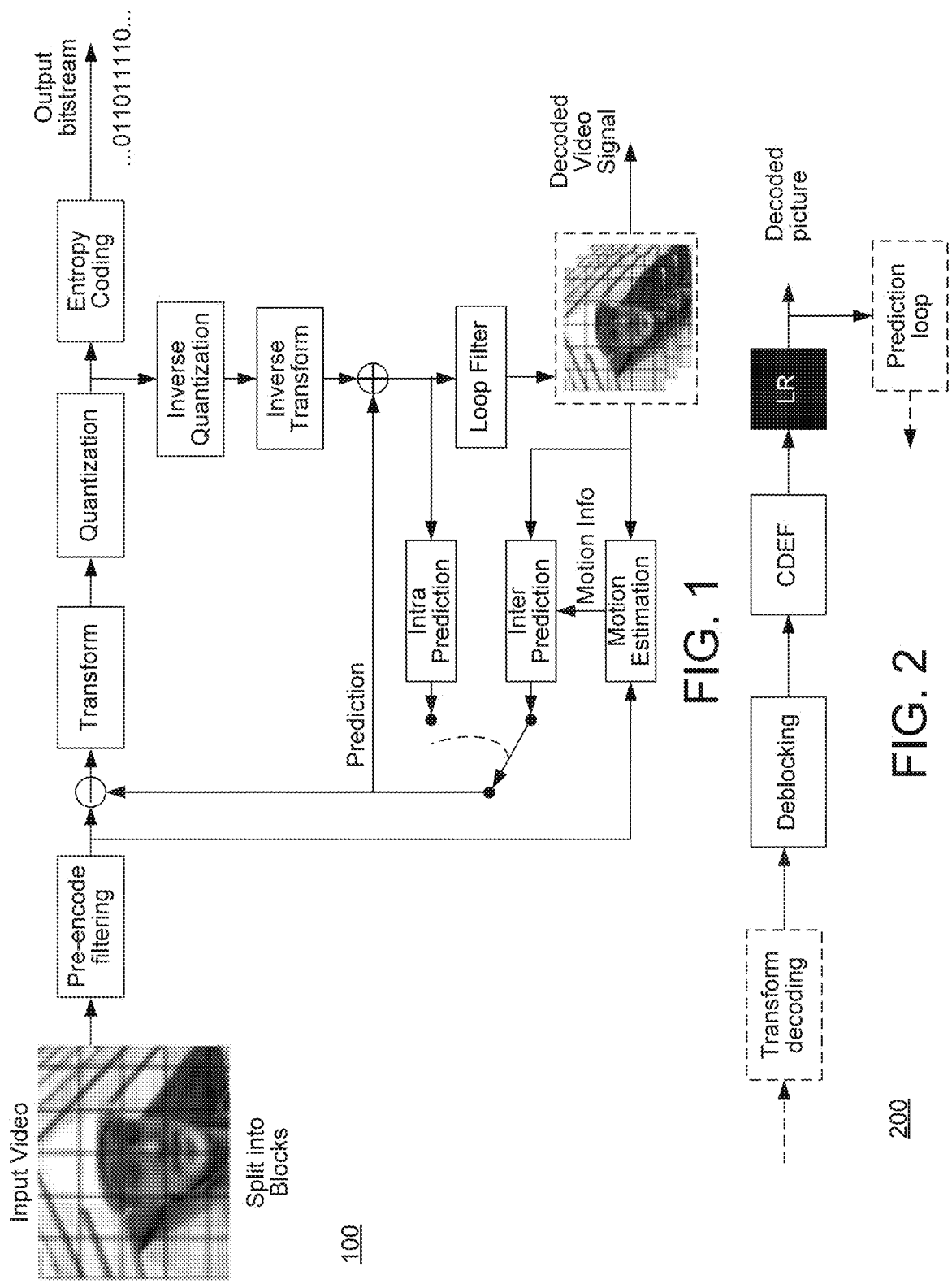

TECHNIQUES FOR CONTOURING/BANDING ARTIFACT REMOVAL IN COMPRESSED IMAGE/VIDEO

CLAIMS FOR PRIORITY

The present disclosure benefits from priority conferred by application Ser. No. 63/599,211, filed Nov. 15, 2023, entitled "Techniques For Contouring/Banding Artifact Removal In Compressed Image/Video," and application Ser. No. 63/595,142, filed Nov. 1, 2023, also entitled "Techniques For Contouring/Banding Artifact Removal In Compressed Image/Video," the disclosures of which are incorporated herein in their entireties.

BACKGROUND

The present disclosure relates to video coding techniques and, in particular, to techniques that combat banding artifacts in video streams that are coded according to lossy coding processes.

Introduction to Video Codecs

In the recent years, the adoption of advanced video coding standards, such as H.264/AVC, HEVC, and AV1 specifications, has shown significant benefits in high-quality video streaming applications over bandwidth-constraint networks. In addition, the newly finalized video coding standard H.255/VVC demonstrates notable improvements in terms of bitrate reduction and visual quality enhancement compared to the existing standards. An emerging video codec software called the AOM Video Model (AVM), is under development by AOMedia as a successor to the AV1 specification.

A typical codec splits an image/video frame into smaller coding blocks named coding-tree units (CTUs) or super-blocks (SBs). A CTU or SB can further be partitioned into smaller coding blocks (CBs). FIG. 1 demonstrates the H.266 coding standard at the encoder side. Most video coding specifications including HEVC and AV1 follow a similar logic as depicted in FIG. 1. The video encoder can predict pixel samples of a current block from neighboring blocks by using intra prediction. Alternatively, a codec may also use pixel information from different temporal frames and blocks from other frames by using inter prediction techniques. Some of these prediction techniques may include the use of motion compensated prediction, temporal interpolated prediction, weighted prediction, or utilize a combination of both inter and intra prediction. The prediction stage aims to reduce the spatially and/or temporally redundant information in coding blocks from neighboring samples or frames. After the prediction, a residual block is formed by subtracting the predicted values (e.g., with intra or inter prediction) from the original source. The encoder may further apply a transformation on the residual block using a combination of the discrete cosine transform (DCT), discrete sine transform (DST), or other possible transforms. The block on which a transform is applied is usually referred to as a transform unit (TU).

The transform stage exploits the spatial correlation in the residual block by converting the residual block from the spatial domain into the frequency domain. That transform stage effectively reduces the number of bits required to transmit the energy-compacted coefficients. It is also possible for a video codec to skip the transform stage altogether.

The resultant coefficients in the transform domain (or after skipping a transform) are quantized to further reduce the number of bits required to represent the transform coefficients. Optimization techniques such as trellis-based quantization or dropout optimization or coefficient thresholding can be employed to tune the quantized coefficients based on some rate-distortion criteria to reduce bitrate. The quantization stage can cause significant loss of information especially at low bitrate targets and may lead to visible distortion in the reconstructed images. The tradeoff between the rate (the number of bits sent over a period of time), and distortion is often controlled with a quantization parameter (QP). In the entropy coding stage, the quantized transform coefficients, which usually make up the bulk of the final output bitstream, are signaled to the decoder using lossless entropy coding methods such as the multi-symbol arithmetic coding (MS-AC) in AV1/AVM and context-adaptive binary arithmetic coding (CABAC) in VVC and HEVC.

In addition to the quantized coefficients, some important encoder decisions are signaled to the decoder as side information. Some of this information may include partitioning types, intra and inter prediction modes (e.g., weighted intra prediction, multi-reference line modes, etc.), transform type applied to transform blocks, the position of the last coded coefficient in a TU and or other flags/indices pertaining to tools such as a secondary transform. The decoder uses all the information above to perform an inverse transformation on the de-quantized coefficients and reconstruct the pixel samples. Additional tools including restoration, de-blocking, and other loop-filters may also be applied on the reconstructed pixel samples to enhance the quality of the reconstructed images.

In-Loop Filtering in AVM

Due to the quantization errors, the difference of motion vectors and/or the difference of coding modes of the current block and its neighbor blocks, artifacts are normally introduced in the reconstructed image/video frames. Therefore, most video codecs support in-loop filter tools to enhance the visual quality of the reconstructed frames. Another important benefit of the in-loop filters is the enhanced quality of the reference frames leading to better prediction samples which can improve the compression efficiency. Such filters are said to be "in loop" because they are contained within a prediction loop that operates on reference frames maintained by video coders and decoders for prediction purposes. FIG. 2 illustrates the filtering stage of the AVM framework.

One of the major visual quality issues in the reconstructed frames is blocking artifacts. This artifact presents discontinuities along block boundaries. It is quite noticeable when the video is encoded using lower bitrate setting. To overcome this artifact, an adaptive deblocking filter is implemented along the horizontal and vertical boundary of each transform block. Following the deblocking filter process, a constrained directional enhancement filter (CDEF) is deployed to recover the edge feature in the original video. After the edge feature is enhanced by CDEF, the frame is passed to a loop restoration process to reduce the difference between the reconstructed frame and the original frame by minimizing the sum of square error term.

Constrained Directional Enhancement Filter (CDEF)

One of the de-banding techniques presented in this disclosure exploits the existing design of the AVM de-ringing tool named CDEF. The main goal of the CDEF is to filter out coding artifacts while retaining the details of the image. It was first adopted in the AV1 standard and exists in AVM as well. The CDEF filter performs a directional pattern search for each 8×8 block (denoted in this disclosure by $d_{opt}$) and then adaptively applies a filter along the direction $d_{opt}$, and to a lesser degree, along the directions rotated 45 degrees from $d_{opt}$. The filter strengths are signaled explicitly, which allows a high degree of control over the blurring. FIG. 3 shows the directions detected by the CDEF edge-direction detection. It is worth to note that the direction search is done at both the encoder and decoder and no signaling is done for that.

FIG. 4(a) shows the primary filter taps used for each direction, and FIG. 4(b) shows the secondary filter taps which are used in conjunction with the primary filter. The secondary taps form a cross, oriented 45° off the direction $d_{opt}$. The reason is that the primary filter sometimes cannot sufficiently reduce the ringing artifact. The directional filter taps are applied along $d_{opt}$ to keep the directional structures (i.e., true edges), while reducing the ringing artifacts within the structures. Additionally, to avoid excessive blurring, a non-linear low-pass filtering operation is used so that the pixels, which are not similar to the pixel being filtered, are deemphasized.

Loop Restoration in AVM

Loop Restoration Architecture

Loop restoration is a powerful filter tool which can reduce the difference between the reconstructed frame and its original frame as well as can reduce the bitrate of the video since it enhances the quality of the reference frame. The loop restoration filter is applied to units of either 64×64, 128×128, or 256×256 pixel blocks, named loop restoration units (LRUs) or RU. In AV1, each RU can independently select either to bypass filtering, to use a Wiener filter, or to use a self-guided filter. It is applied to the reconstructed samples after any prior in-loop filtering stages.

The Wiener filter applies a 7×7 separable filter shape through the RU. The filter coefficients are derived in the encoder and sent to the decoder. To save the coefficient signaling overhead, the filter coefficients are normalized and are constrained to be symmetric. On the other hand, the self-guided filter generates two denoised version using the mean and gradient information of a window around current sample. Then, the reconstructed sample is derived using the difference between the unfiltered sample and the two denoised versions using a linear formular. The parameters supporting the generation of the denoised versions, and the linear factors are derived at the encoder and signaled in the bitstream to the decoder.

In addition to the (separable) Wiener filter and the self-guided filter, AVM supports two new filter modes: pixel-classified Wiener (PC-Wiener) and non-separable Wiener. The two added loop restoration modes are based on a 7×7 diamond origin-symmetric shape filter. The 13 unique filter coefficients of the non-separable Wiener mode are derived at the encoder for each RU using a straightforward linear regression and sent to the decoder. In contrast to the Wiener non-separable filter, the filter coefficients of the PC-Wiener mode are derived at the decoder side from a bank of trained filters. At the decoder, the directional feature and transform skip information are used to derive the filter index for a PC-Wiener RU.

In the frame level, two loop restoration modes are supported including single tool frame mode and switchable tool frame mode as illustrated in FIG. 5. In the first mode, each RU can be turn on/off between RESTORE_NON (no filter) and one of RESTORE_X where RESTORE_X is one of the available modes signaled in the frame header. In the later mode, each RU can be filtered using one of the available tools. The selection of the filter mode for a RU is based on a rate-distortion optimization process. The selected mode is signaled at the RU level.

Pixel-Classified Wiener Loop Restoration Mode

The introduction of the pixel-classified (PC) Wiener loop restoration mode is summarized as follows.

Established denoising techniques can be seen as using magnitudes of features (scalar products of the decoded picture with pre-designed feature filters) that establish filtering classes in conjunction with thresholds. They then apply appropriate filters for each class. Such techniques typically realize many different filtering classes and associated different filtering possibilities.

RESTORE_PC_WIENER uses four simple gradient filters (all with taps [−1, 2, −1]) operating in horizontal, vertical, diagonal, and antidiagonal directions.

At every 4×4 block the averaged magnitude of each filter leads to a classification feature. Four thresholds are subtracted from the four classification features and the results are used to consult a filter look-up-table (LUT). The LUT in turn yields an origin-symmetric non-separable filter (currently 13 unique taps for luma—mode is turned off for chroma.) The filter is selected from a pre-trained bank of 64 filters.

The filter shape of the non-separable filter applied in PC-Wiener is illustrated in FIG. 6. In this figure, the coefficients with the same index (origin symmetric), the same reference number, have identical value.

The derived filter is then used to obtain the filtered output at that block. The encoder and decoder perform the same set of calculations in deriving the filter. Naturally, the decoder only performs the calculation on RUs where the mode is signaled.

Filter Derivation:

Directional filter magnitude calculation: FIG. 7 illustrates the magnitude calculation.

Calculation of the classification features: FIG. 8 illustrates the calculation of the classification features and the derivation of the non-separable filter. Once the four features are computed they are averaged over fixed windows to arrive at the averaged features. The averaging is performed around the 4×4 block in a 6×6 window. The averaging value is used together with the transform skip information to get the filter index for the 4×4 block.

Banding Artifacts in Compressed Image and Video

Although many advanced coding tools have been integrated into the modern video coding standards leading to a significant improvement in visual quality, banding artifacts, which are also referred to as contouring artifacts, remain in the reconstructed videos and reduce the subjective quality of otherwise high-quality and high-definition encoded videos.

Banding artifacts are quite noticeable in the reconstructed video with smoothly-varying regions (e.g., sky and plain wall). One of the main causes of the banding artifact is the quantization error of the residual (i.e., the difference between the prediction and the original samples). In the smooth picture areas, the transform coefficients have low amplitudes which are mostly quantized to 0. This means that such blocks tend to be encoded using a residual skip mode and in turn the decoder does not receive transform coefficients from the encoder. It can only rely on the prediction samples when reconstructing a block. Since the prediction is normally obtained by an interpolation step of several reference samples, it can make false contours due to the rounding and cause banding artifacts. Without residual information sending to the decoder for the reconstruction step, that false contours are retained in the reconstructed image. Some operations such as spatial filtering, especially with low-pass filters can exacerbate these false contours and smear the banding artifacts across a larger region of the reconstructed image.

Since banding artifact is a major visual quality issue of compressed video/images, there have been many efforts on mitigating this artifact. The prior de-banding approaches can be classified into three main directions. The approaches of the first direction attempted to update the source content before encoding. These solutions mainly used for de-contouring scalar-quantized images rather than the compressed video/image with the banding artifacts. The second approach is featured by an in-loop process, in which the quantization step is adaptively adjusted for mitigating banding artifacts. In the last category of de-banding, a post-filtering is deployed on the reconstructed video/image. The last approach has been most broadly studied and used since it provides freedom and flexibility for decoder implementation. Most post-filtering de-banding removal techniques implement two steps including detection of banding area following by a local spatial de-banding process. To detect banding regions and banding level, local features such as the image gradient, contrast are exploited. Once an area is detected as banding, the banding artifacts are subsequently removed by low-pass smoothing filters, dithering, or a combination of filtering and dithering. It should be noted that, the banding detection and de-banding in the postfilter approach are typically complex and hard to incorporate into the coding loop.

Recently, the banding issue has drawn a significant attention in the development of the next generation AV1 standard, named AVM. In prior work, the similarity of a pixel and its neighbors below and to the right are used to mark if a 4×4 block is banding or not. If a block is marked as "banding," a dithering process which is based on the local histogram of a window surrounding the 4×4 block is deployed to mitigate the banding artifact crossing the block. The work proposes local histogram derivation together with finding the maximum value and the second maximum values in the histogram to support the dithering process, but it would require a significantly high cost for hardware implementation and also significantly increases the decoding runtime. In other work, several techniques were proposed to remove the banding artifact for AVM such as restrictions of the intra prediction modes, addition of dithering to the transform coefficients, and dithering of loop-filter output. There have been strong concerns about adoption of these other techniques into AVM. These latter methods modify the process of many coding tools of the codec which requires careful study. In addition, both techniques significantly reduce the coding efficiency obtained by a codec.

BRIEF DESCRIPTION OF THE DRAWINGS

FIG. 1 provides coding outline of a video coder.

FIG. 2 illustrates exemplary in-loop filter tools supported in an AVM video codec.

Figure 3:
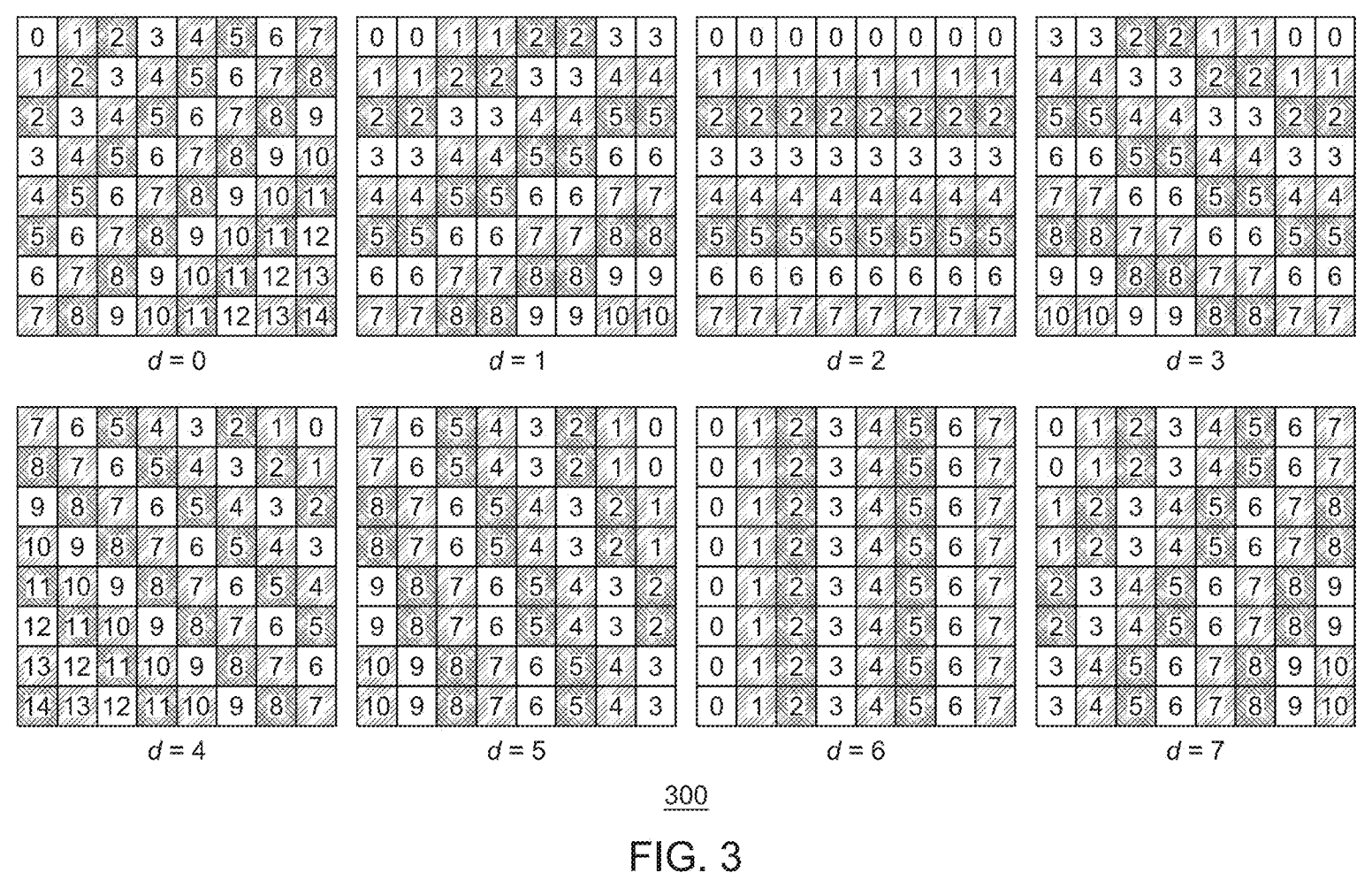

FIG. 3 illustrates directions detected by CDEF edge-direction detection.

DETAILED DESCRIPTION

Figure 4A:
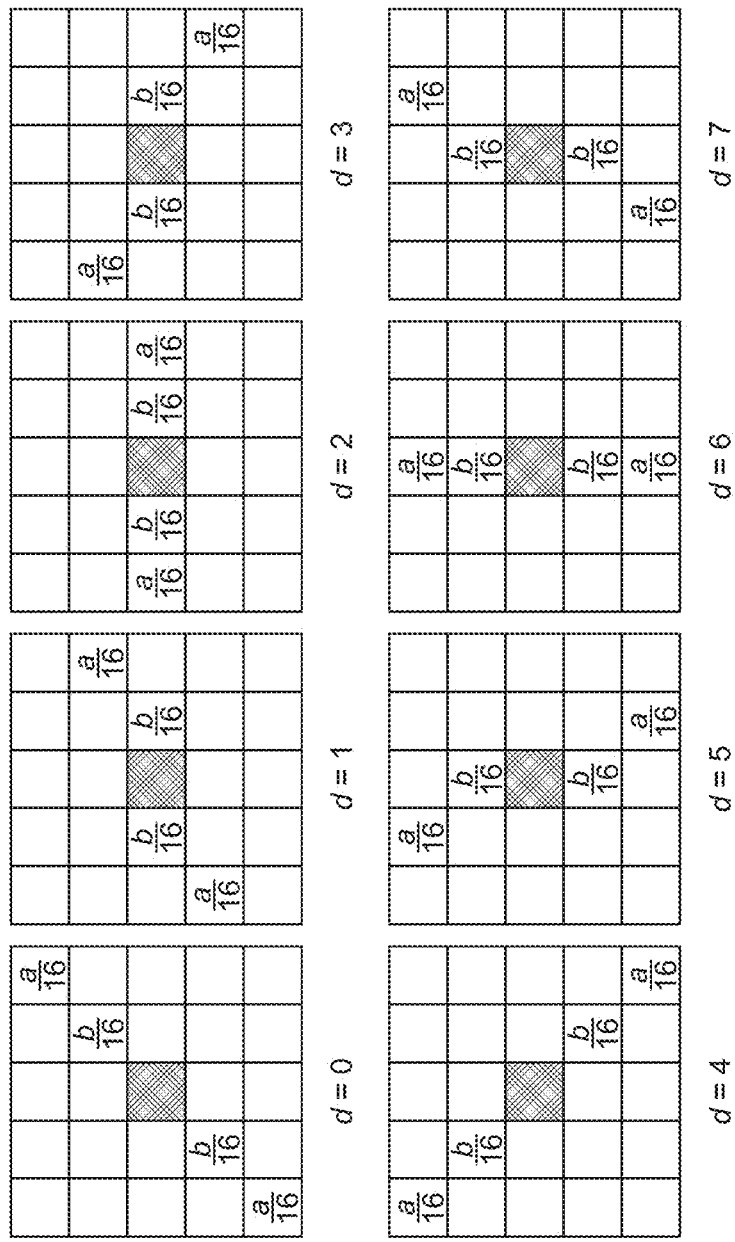
FIG. 4(a) and FIG. 4(b) illustrates directional filter taps for a CDEF.
Figure 4B:
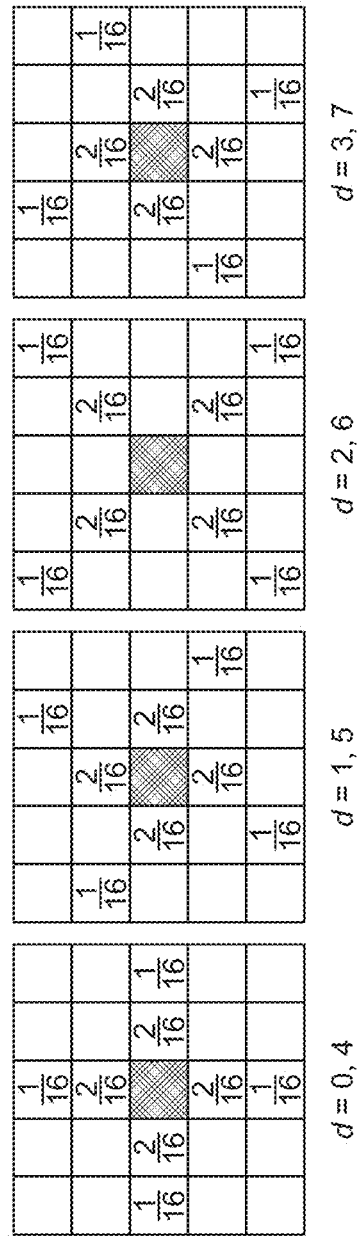
Figure 5:
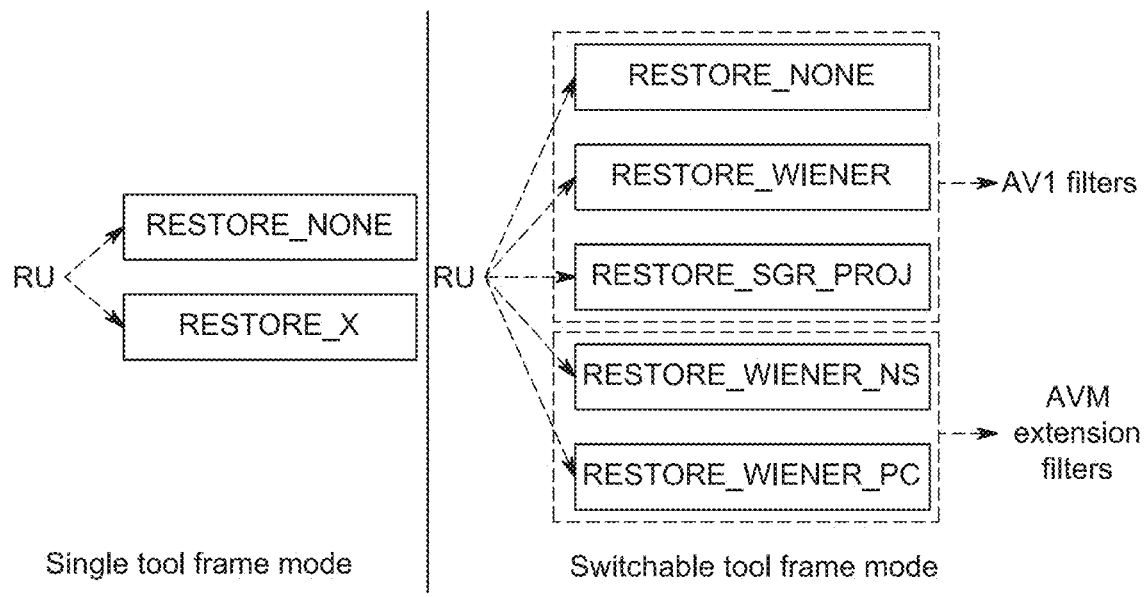
FIG. 5 illustrates a loop restoration architecture in an AVM video codec.
Figure 6:
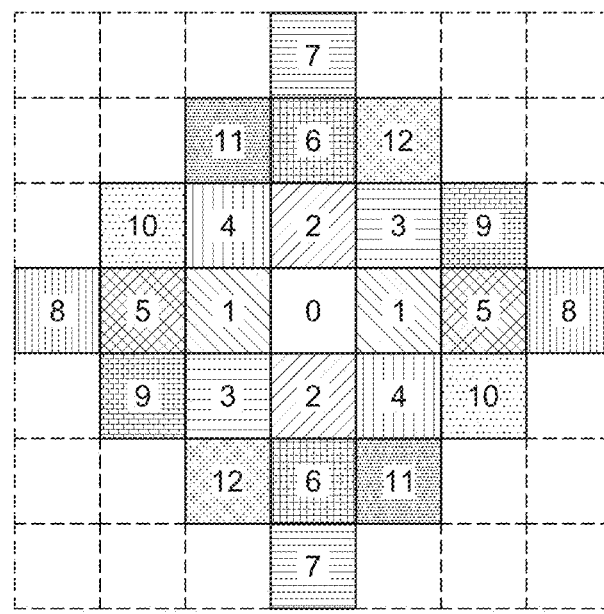
FIG. 6 illustrates a non-separable filter applied in PC-Wiener restoration mode.
Figure 7:
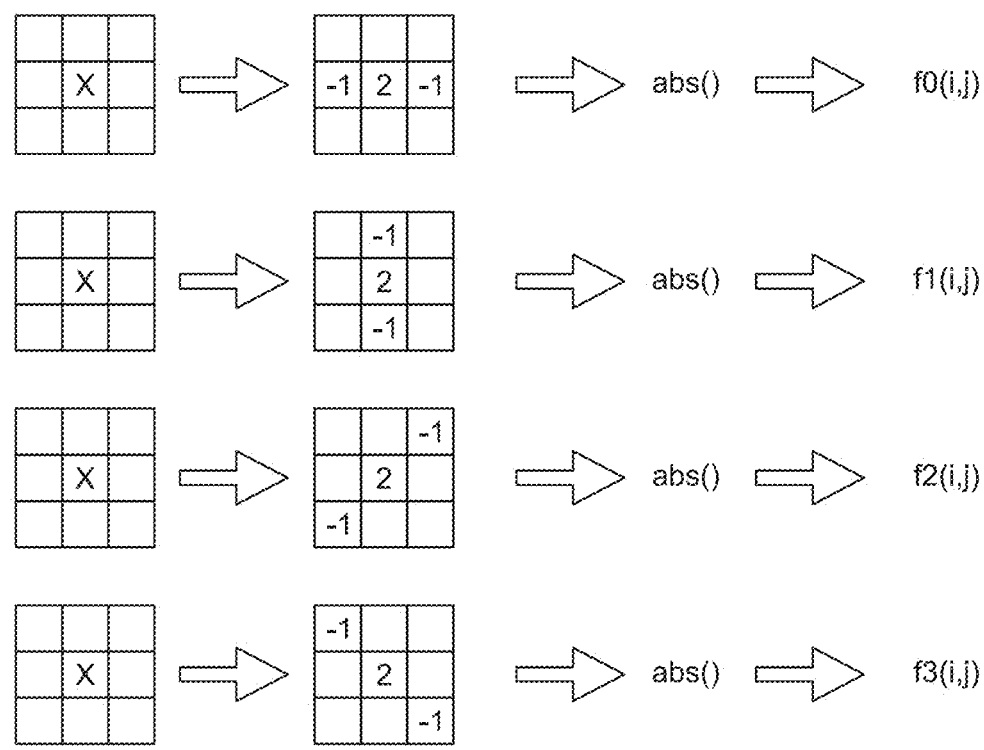
FIG. 7 illustrates multi-directional gradient calculations for PC-Wiener classification.
Figure 8:
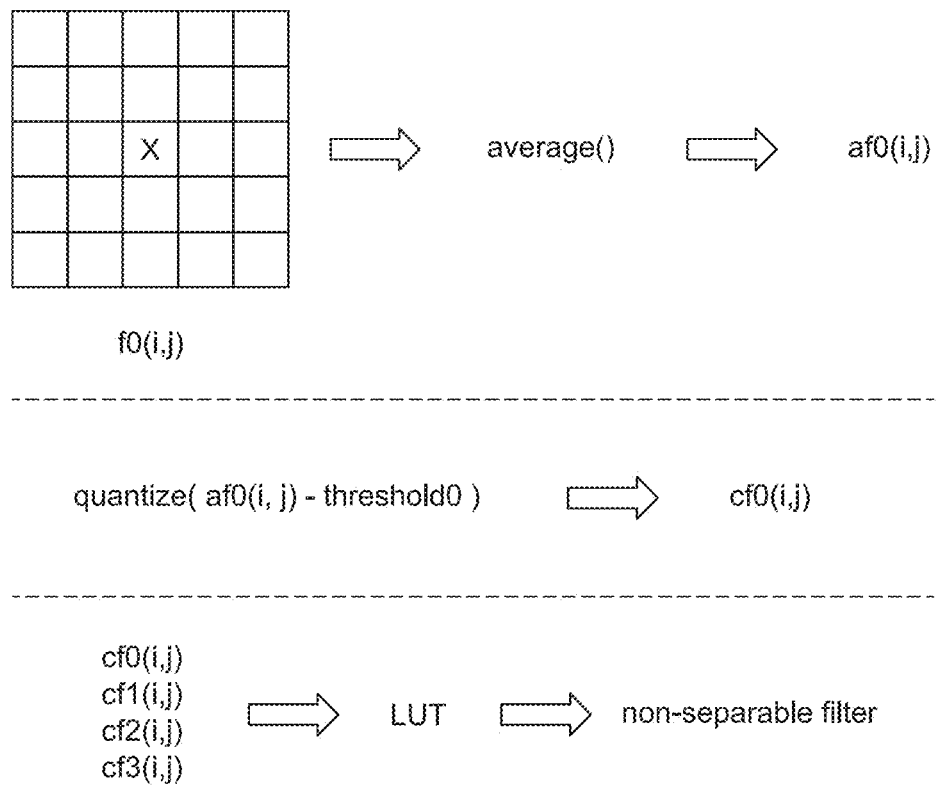
FIG. 8 illustrates classification of blocks using gradient information in PC-Wiener mode

This disclosure presents various low complexity, hardware friendly techniques to mitigate the banding artifact while maintaining the compression efficiency. In general, the proposed solutions include two steps, including: (1) banding detection followed by (2) a de-banding filter. In one embodiment, the Constrained Directional Enhancement Filter (CDEF) tool of AVM, which is used for deringing filtering, may be repurposed for de-banding purpose. Repurposing a CDEF in this manner advantageously conserves resources in a codec by finding new uses for hardware pipelines and information calculations that already may be employed in a codec. In a second embodiment, the proposed techniques consist of two steps including a banding detection based on the gradient information following by a de-banding filter. The gradient information can be extracted from the existing filters present in AVM, or any video codec. It should be noted that in the second design, the hardware design of PC-Wiener loop restoration mode may be utilized when the proposed method is applied in AVM. The methods and embodiments presented in this document can be beneficial to the existing or next generation image/video coding standards/systems. The examples that will be detailed herein may extend to other video coding standards such as VVC/H.266 and its successor test model ECM.

1. De-Banding with CDEF

In this disclosure, the CDEF-based embodiment is described to provide a low-complexity de-banding approach that reuses the hardware/software components already existing in the AV1 standard and the AVM codec. The main benefit of doing so is that only a minimal incremental implementation cost is incurred for both the hardware and software when CDEF is used. To this end, this proposal exploits the in-loop filter and CDEF designs in AVM.

This embodiment uses CDEF for both banding detection and de-banding processing. The CDEF first determines the direction, denoted by $d_{opt}$, best matching the pattern in each block to the original image. If CDEF is enabled for a block, direction search is done for each block within that block both at the encoder and decoder. In a traditional application of CDEF, a non-linear filter along $d_{opt}$ may be applied to block image content to reduce the ringing artifacts. In this embodiment, as a preferred embodiment low-complexity filtering and dithering methods are applied along a different direction, $d_{opt}^\perp$, which is mathematically orthogonal to the original CDEF direction $d_{opt}$.

In this embodiment, a banding artifact is first detected for each block. The computation overhead for banding detection is minimal since the embodiment mainly uses the intermediate values calculated by the CDEF edge-direction detection. For de-banding stage, the embodiment uses the traditional idea of using the directional taps but with some differences. First, de-banding is performed along $d_{opt}^\perp$ and not in the direction of $d_{opt}$. In a block for which banding is detected, $d_{opt}$ denotes the direction of a false edge. Filtering or de-banding along $d_{opt}$ does not help to remove the false edge; however, filtering along the direction perpendicular to $d_{opt}$ will effectively remove the false edge. Second, for banding mitigation, the embodiment need not apply non-linear filters that are used by traditional CDEF applications. Such non-linear operations incur complexity for both hardware and software implementations. Instead, the present disclosure proposes a variety of solutions with much less complexity including the regular linear filtering and random sampling. All these approaches are significantly less complex as compared to the original CDEF non-linear filters. However, if desired, CDEF non-linear filters can also be used for the benefit of de-banding as disclosed below in one of the embodiments.

1.1. Proposed De-Banding Scheme

According to another embodiment of the present disclosure, a new banding detection and de-banding method is described. This embodiment first may use the edge-direction detection of the CDEF to find the direction perpendicular to the banding direction. The intermediate values computed by the direction search of CDEF may be also used to detect if the banding artifact is indeed present in a given block. This embodiment then may perform a de-banding process to a block if it is detected as banded. Banding detection may be done at block level, while the banding mitigation is performed at the pixel level. Each of the banding detection and banding removal stages may have its own control parameters to adjust the aggressiveness of banding detection and the dithering noise level. These parameters may be signaled at sequence level, frame level, or filter block level, so that an encoder may tune these parameters considering the trade-off between the added noise level, complexity, coding loss, rate increase and visual quality.

1.2. Block Level Operations

Figure 9A:
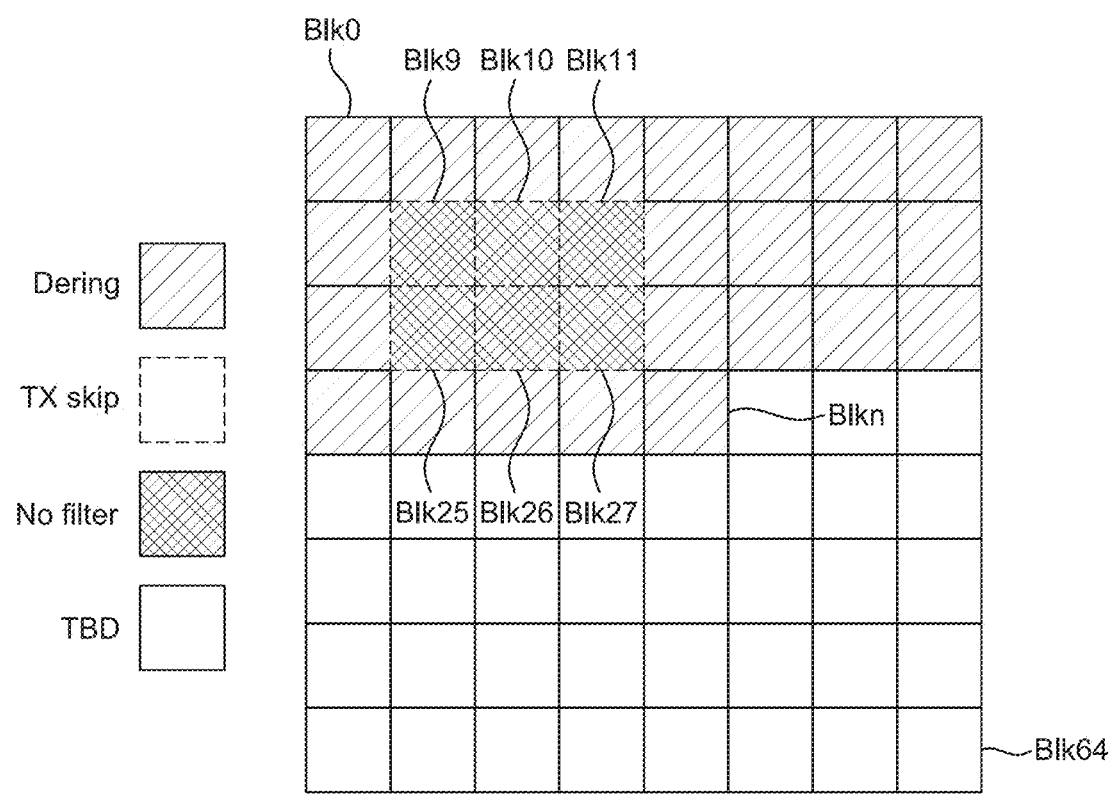
FIGS. 9(a)-(c) shows application of CDEF to de-banding according to an aspect of the present disclosure.
Figure 9B:
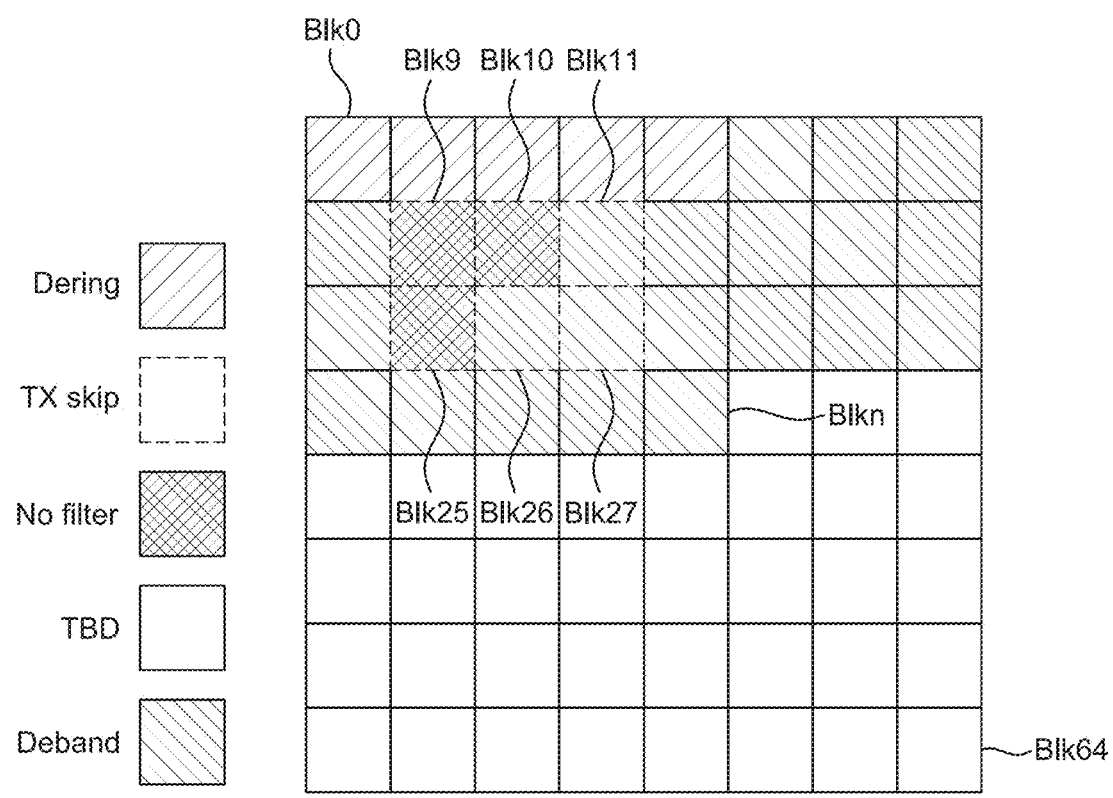
Figure 9C:
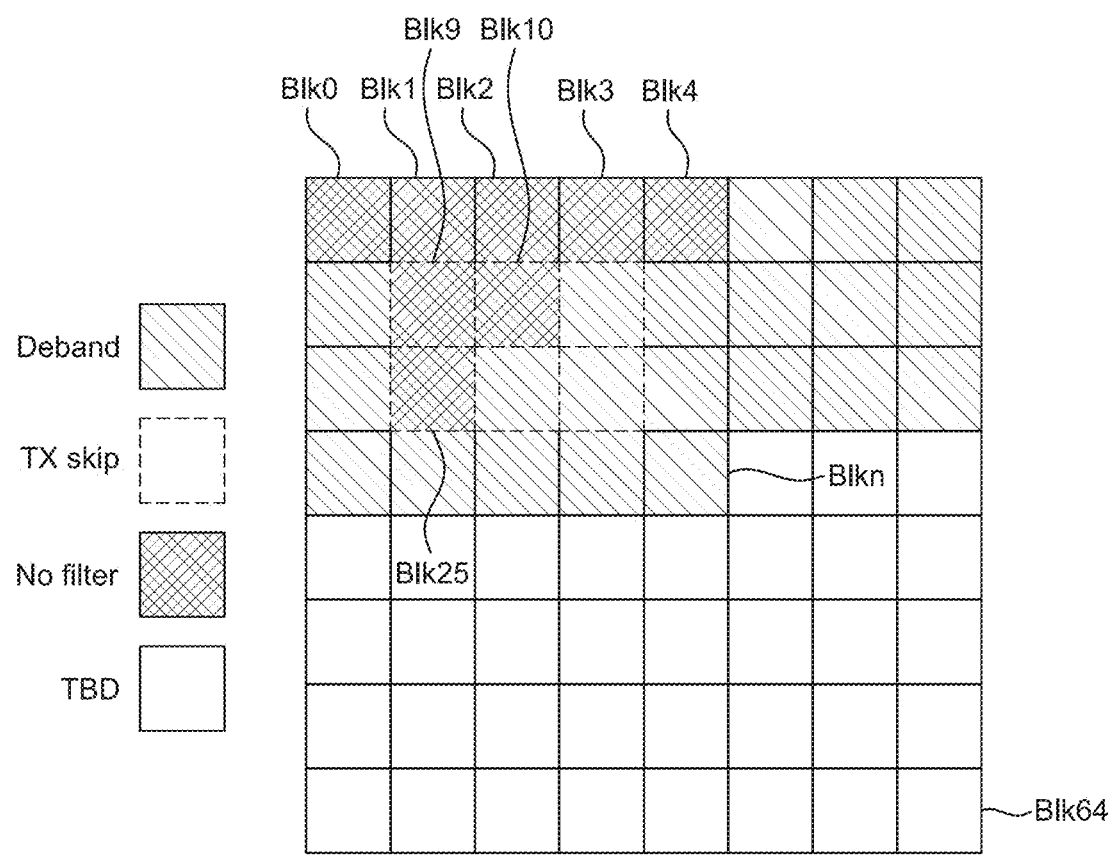

FIGS. 9(a)-(c) show examples of how CDEF and de-banding may be applied to each 8×8 block of a 64×64 filter block. In each case, the 64×64 filter block is shown as having blocks Blk0-Blk63. Each figure also illustrates a case where the blocks are processed in raster scan order, where processing has reached an arbitrary block Blkn within the respective filter block. Blocks Blkn-Blk63 are labeled TBD indicating they have not yet been coded in the examples of FIGS. 9(a)-(c).

FIG. 9(a) shows a case where de-banding is disabled at the filter block level while CDEF is enabled for dering purposes. CDEF edge detection and filtering are not performed for transform-skipped blocks.

In another example, the CDEF as well as de-banding process may be skipped (bypassed) when the filtering region has a transform-skipped block. In another example, as shown in FIG. 9(b), the CDEF edge and de-banding are enabled for the current filter block, where the CDEF detection is done for all the blocks including the transform-skipped blocks. As discussed, the CDEF detection operations generate intermediate calculation values that are helpful in performing banding detections. The banding detection may be performed for each block using the intermediate calculations done during the edge-direction detection stage. If a block is detected as banded, de-banding may be performed for that block, otherwise CDEF is applied (if the block is not transform-skipped) or no filtering is done. As opposed to the traditional CDEF flow illustrated in FIG. 9(a), the edge-direction detection and banding detection may be performed for both regular and transform-skipped blocks, which are often prone to banding or contouring artifacts.

FIG. 9(c) shows another example where de-banding is enabled for the filter block, while CDEF is disabled. In this case, a block may be de-banded if it is detected as banded otherwise, it remains unfiltered. In another example, de-banding process may be disabled for blocks coded using identity transform while it may be enabled for other types of transforms. In another example, de-banding process may be disabled for secondary transforms (such as IST in AVM or LFNST in VVC). In another example, the de-banding may only be applied if transform coded blocks include N non-zero (significant) coefficients, where N may be equal to 1 or more and the value N may depend on block size.

In another embodiment, information extracted by the CDEF edge-direction detection may be used to detect banding artifact for each block processed within the current filter block. A block may be selected for either (1) de-banding processing, or (2) filtering by the CDEF or any other downstream in-loop filter (such as loop-restoration), or (3) not filtered at all. The CDEF edge-direction detection is enabled for both the regular and transform-skipped blocks. A block may be de-banded (i.e., filtered or dithered) if banding is detected for that block, and banding reduction may be done by adding a de-banding signal to that block. (Examples of a de-banding signal include, but are not limited to, any type of dithering or low-pass filtering with random round-off noise added to the weighted sum). Parameters of the de-banding signal may be derived from a set of neighboring pixels along the direction perpendicular to the banding direction (or false edge found by the CDEF direction search engine). These neighboring pixels may comprise one line or multiple lines of pixels along the perpendicular direction and may be formed in any shape and size.

1.3. In-Loop Versus Post-Loop De-Banding

The de-banding techniques in this disclosure can be implemented either as an in-loop filter (like CDEF and loop-restoration) or used as a post-loop solution for de-banding where de-banding is done on the final reconstructed frame outside of the prediction loop but before display. One benefit of the post-loop solution is that it can be used as a standalone postfilter and applied to the output of any video decoder; the solution need not be integrated into a video coding specification. Another benefit is that the video encoder does not need to perform post-loop de-banding. Both in-loop and post-loop alternatives are explained in the following discussion.

[In-loop] In one embodiment, CDEF filtering and de-banding may be performed simultaneously, and de-banded pixels may be written to the reconstructed frame buffer while pixels filtered by CDEF may be written to the reference frame buffer. In this case, a flag may be signaled for each block indicating whether it is banded or not. The value of the flag may be used in downstream loop-filtering steps, so that loop-filtering operation may be skipped for de-banded (or noise added) de-banded blocks. A high-level flag (sequence or frame level) may be signaled to indicate whether filtering on de-banded blocks is allowed or not.

[In-loop] In another embodiment, de-banding during the CDEF stage may be skipped, a codec need only store $d_{opt}^\perp$, and a de-band flag for each block may be computed indicating whether it is to be de-banded or not. This information may be passed to the downstream in-loop filters, and de-banding may be done within the last (or any other) downstream in-loop filter. For example, in the Wiener filter stage (which is applied after CDEF), a de-banded flag is first checked for each block. If the de-band flag is enabled for a block, that block may be de-banded. Otherwise, the rest of filter (such as loop restoration) may be performed.

[In-loop] In another embodiment, neither banding detection nor de-banding is done within the CDEF stage, and both are done within a downstream in-loop filter. For example, during the Wiener filter stage, the CDEF direction search engine may be used again to detect banding for each block. If banding is detected, dithering may be done for that block otherwise it is filtered by the downstream in-loop filter (Wiener filter in this example).

[Post-loop] In one embodiment, the de-banding stage may be not performed during the CDEF stage. Only $d_{opt}^\perp$ and a de-band flag for each block indicating whether it is banded or not may be stored. This information is passed down the pipeline such that dithering is done out of the loop, i.e., after reconstructing the current frame and before displaying the frame.

[Post-loop] In another embodiment, neither the banding detection nor de-banding may be done during the CDEF filtering stage. Both the banding detection and de-banding may be performed after reconstructing the frame and before displaying it. The CDEF edge-direction detection may be used again to detect banding for each block of the reconstructed frame. If banding artifacts are detected in a block, de-banding process may be performed.

1.4. Banding Detection at Block Level

For banding detection, embodiments of the disclosure reuse any final or intermediate quantities calculated by the CDEF edge-direction detection. The CDEF finds the direction that best matches the pattern of a block by minimizing the directional variance $\sigma_d^2 = \Sigma x^2 - s_d$, where $\Sigma x^2$ is the sum of samples of the (deblocked) block and $s_d$ is calculated for each direction $d \in \{0,1,2,3,4,5,6,7\}$. The direction $d_{opt}$ is the one that that minimizes $\sigma_d^2$. Since $\Sigma x^2$ is the same for all directions, CDEF reduces the computations by skipping calculating that and calculating $\max(s_d)$ instead. For de-banding, however, the sum of square may be calculated $\Sigma x^2$ or any other quantities not computed by the CDEF edge-direction detection. This embodiment also may determine $d_{opt}^\perp$, which is simply calculated by $d_{opt}^\perp = (d_{opt}+4)$ & 7. Another quantity useful for banding detection is $\max(\sigma_d^2) = \Sigma x^2 - \min(s_d)$. The quantity $\min(s_d)$ may be computed like $\max(s_d)$ (which is directly computed by CDEF) and the computational overhead is minimal since $s_d$ is already computed for all values of d. In an alternative embodiment, a less complex expression such as $(\Sigma|x|)^2$ may be used instead of $\Sigma x^2$.

Figure 10:
FIG. 10 illustrates banding detection applied to an exemplary video frame according to an aspect of the present disclosure.

In one embodiment, a banding detector may use any final or intermediate quantities calculated by the CDEF edge-direction detection as well as any auxiliary quantities not directly computed by the CDEF edge-direction detection to detect banding artifact for each block. These quantities may include but are not limited to $d_{opt}$, $d_{opt}^\perp$, $\Sigma x^2$, $\min(s_d)$, $\max(s_d)$ etc. In one example, a simple detection algorithm compares $\max(\sigma_d^2) = \Sigma x^2 - \min(s_d)$ with a threshold T and marks the block as banding block if $\max(\sigma_d^2) < T$. The premise is that a block probably has banding artifact if its directional variance is small for all the tested directions. FIG. 10 shows a detection example, where each dark block is detected to have banding artifact. In this simple detection algorithm, the de-band flag is set for a given block if and only if the block is marked as banded.

In another example, a block may be marked as a banding block if $\sigma_{d^\perp}^2 - \sigma_d^2 < T$. A small value of $\sigma_{d^\perp}^2 - \sigma_d^2$ may indicate that there is no dominant directional pattern in the block and it mainly includes noise. Since $\sigma_d^2 = \Sigma x^2 - s_d$ and $\sigma_{d^\perp}^2 = \Sigma x^2 - s_{d^\perp}$, the detection simplifies to $s_d - s_{d^\perp} < T$, where both $s_{d^\perp}$ and $s_d$ are calculated by the CDEF direction detection.

In another embodiment, a banding detector may use any side information available in the neighboring blocks to refine the detection. Depending on the implementation, banding detection may be already completed for all or a subset of neighboring blocks when banding detection is done for the current block. The information of such neighboring blocks can be used to set the de-band flag for the current block. In one example, the de-band flag for the current block is set if and only if banding is detected for the current block and at least K of its neighbors. In another example, we set the de-band flag for the current block if and only if banding is detected and the average of $\max(\sigma_d^2)$ of the neighboring blocks is less than a threshold.

1.5. Signaling

Banding detection and signaling may be applied at sequence level, frame level, and filter block level.

1.5.1. Filter Block Level

In one embodiment, a flag enable_deband_filter_block may be signaled in a coded bit stream for each filter 64×64 filtering block. The decoder may be allowed to perform de-banding for a filter block only if the flag is set to 1. In one example, the encoder may set enable_deband_filter_block if the average of $\max(\sigma_d^2)$ of all the blocks of the filter block is less than a predefined threshold. De-banding decision may also be made via rate-distortion optimization (RDO) as a trade-off between signaling overhead and reducing the error between the source samples (or the reconstructed filter block before de-banding) and the de-banded samples.

In another embodiment, the detection threshold T may be signaled at sequence level, frame level, and filter block level. In one example, a fixed values of T is used for the entire sequence and signaled in the coded bit stream. In another example, different values of T may be signaled for each frame or group of frames. In another example, T may be signaled for each filter block to have a finer control over de-banding aggressiveness. Predictive coding may also be used to predict the values of T from the neighboring blocks, and entropy coding may be used to code the difference between the predicted values and the actual values.

In one embodiment, the block level de-banding may be derived implicitly based on the value of QP used for the block, or the average QP value used for the corresponding filter block area. In one example, when the average QP value used for a filter block area is smaller than equal to a threshold value, the de-banding process is inferred to be disabled for the filter block.

1.5.2. Sequence and Frame Level

In one embodiment, a flag at sequence level (enable_deband_seq) and frame level (enable_deband_frame) may be signaled to enable de-banding at sequence and frame level. De-banding decision may be made at several granularity levels: sequence level, frame level, and filter block level. If de-banding is disabled at one level, it is disabled for all the subsequent levels. Any non-normative frame-level or sequence level banding detection may be used to set enable_deband_seq and enable_deband_frame.

In one example, the CAMBI score may be calculated for each frame and compared that with a predefined threshold. In another example, the CDEF edge-direction detection may be used on a source or a reconstructed frame at any level of the encoder pipeline to collect $\max(\sigma_d^2)$ for each block. It then compares the average of $\max(\sigma_d^2)$ with a threshold T and set enable_deband_frame to 1 if $\max(\sigma_2^2)$<T, or if $\max(\sigma_d^2)$<T for a certain number of blocks within the frame.

In another embodiment, the value of the flag for enabling the proposed de-banding tool at high level (e.g., sequence level, frame level, slice level, tile level) may be inferred based on the value of one or more existing syntax at the same level or higher level.

In one example, when screen content coding tools (including, but not limited to, one or more of Intra Block Copy, palette coding) are enabled, the flag for enabling de-banding is not signaled in the bitstream and is inferred as false (indicating the de-banding tool is disabled).

In another example, the value of the flag for enabling the de-banding tool may be derived implicitly based on the QP value at the same or higher level. When QP value is lower than a threshold, the flag for enabling de-banding may be inferred to be false. In some examples, the value of threshold of QP may be a predefined value, in some other examples, the threshold of QP may be signaled at high level (e.g., sequence level or frame level).

In another example, the value of the flag for enabling the de-banding tool may be derived implicitly based on the value of bit depth used for encoding or decoding. In one example, when the bit depth is larger than or equal to a threshold value $TH_{bd}$ (e.g., $TH_{bd}$ is equal to 12), the flag for enabling the de-banding tool may be inferred to be false.

1.6. Banding Reduction

Figure 11A:
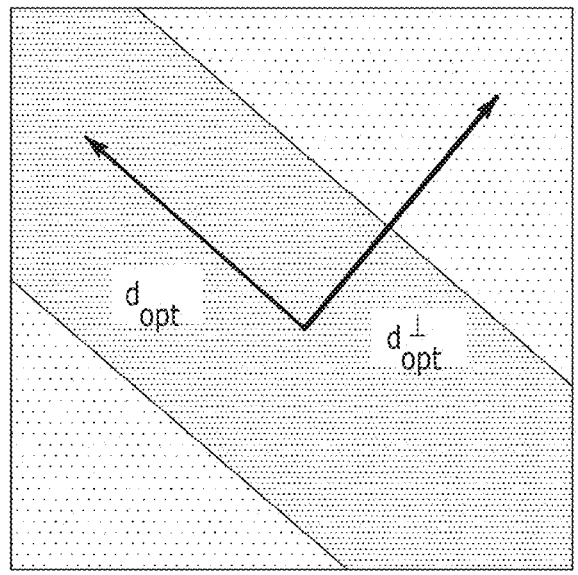
FIGS. 11(a)-(b) illustrate exemplary outcomes of banding detection according to an aspect of the present disclosure.
Figure 11B:
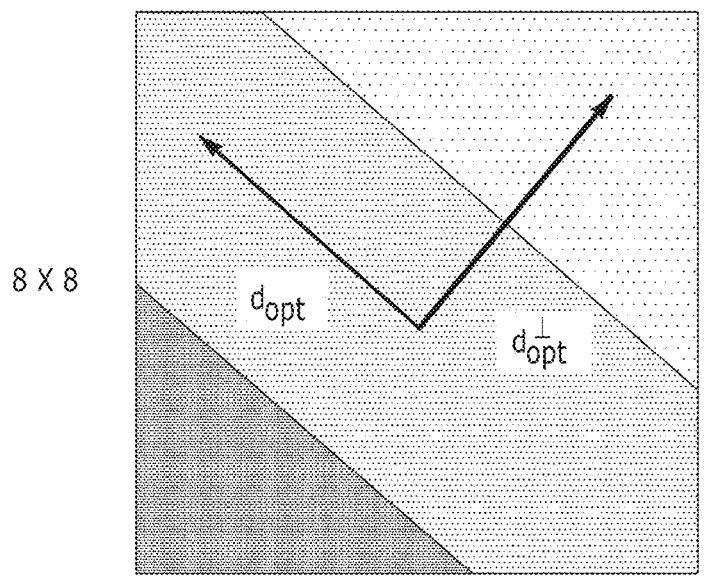

Debanding filtering according to the present disclosure may employ the same support region shapes used by CDEF for deringing filtering. FIG. 4(a) shows the CDEF support region for each direction, where filter length is 2L+1=5. (L=2). Debanding filtering may use the same shape for the support region corresponding to $d_{opt}^\perp$, potentially extended to use larger values of L for de-banding, for example L=8, 10, 12. In the following discussion, it is assumed that the de-band flag is set for the current block and that $d_{opt}^\perp$ is found by the CDEF edge-direction detection. A CDEF directional filter may perform smoothing along $d_{opt}$, while for de-banding we use the support region for $d_{opt}^\perp$ as illustrated in FIG. 11.

Figure 13:
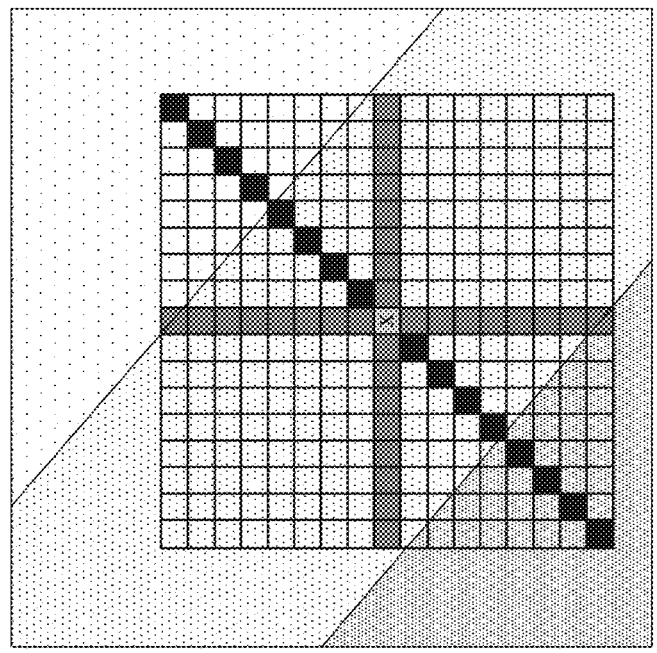
FIG. 13 illustrates exemplary application of dither using a linear FIR filter according to another aspect of the present disclosure.

In additional embodiments, the CDEF support region shapes may be extended in several ways. First, larger values of L may be allowed to increase the of line buffers needed for de-banding to L. Second, L need not be increased but a spatially wider support region may be defined. In general, a support region may comprise multiple pixels along a direction and may be formed in various shapes and sizes. The size of a support region is one way to control the de-banding level: a larger support region is associated with a higher de-banding level. Third, a support region may be extended in more than one direction. In one example, besides encompassing the pixels along the banding direction $d_{opt}^\perp$, a support region may include additional pixels selected to form a cross oriented 45° off the $d_{opt}^\perp$, as shown in FIG. 13. In another example, multiple crosses, one oriented 45° another oriented 30° off the $d_{opt}^\perp$ may be allowed.

1.6.1. De-Banding by Interpolation

In one embodiment, a low-pass directional filter along $d_{opt}^\perp$ may be used to de-band a block. A weighted sum of the pixel being filtered, and its neighboring pixels is calculated where the weights (directional filter taps) and location of the neighboring pixels (support region) are determined based on the direction $d_{opt}^\perp$. The weighted sum may be represented by $y=\Sigma f_i \cdot x_i$, where $x_i$ are the samples from the support region and $f_i$ represent the filter taps. The filtered output is calculated by $(y+\frac{1}{2}\Sigma f_i)/\Sigma f_i$.

Figure 12:
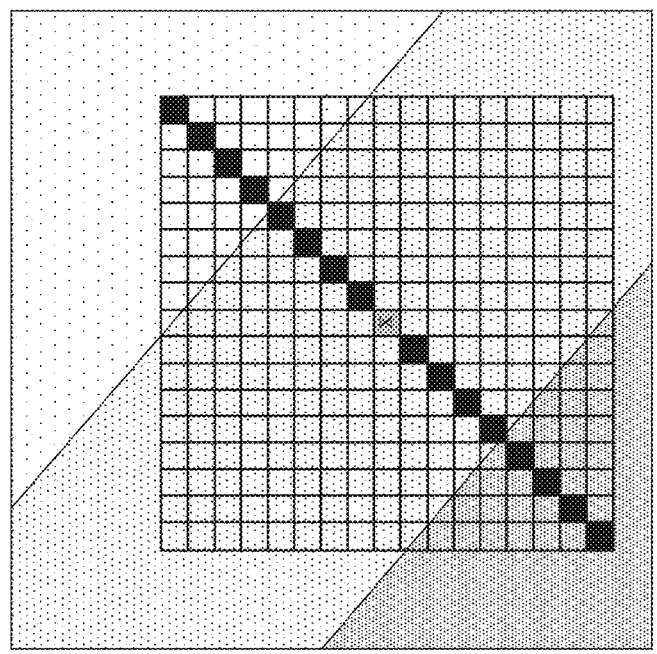
FIG. 12 illustrates exemplary application of dither using a linear FIR filter according to an aspect of the present disclosure.
Figure 14:
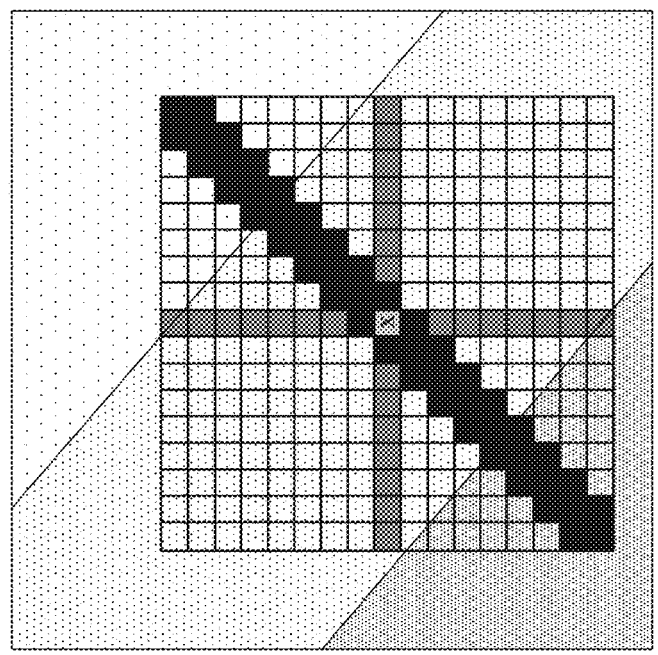
FIG. 14 illustrates exemplary application of dither using a linear FIR filter according to a further aspect of the present disclosure.

In one embodiment, noise may be injected to the output as shown in FIG. 12. A random value may be added to the weighted sum to obtain $(y+\varepsilon)/\Sigma f_i$, where $\varepsilon$ is pseudo-random noise. Clipping may be performed according to the input data's bit depth. In one example, support regions in different shapes and sizes may be used to compute the weighted sum. FIG. 13 and FIG. 14 show examples of different support regions.

In another embodiment, a codec may use the non-linear filter used by the CDEF (or any other non-linear filter) to calculate the weighted sum. Since a linear FIR filter may cause visual artifacts at the boundary of banded and non-banded areas, a non-linear filter may be employed to decrease the weight of the samples whose values are not close to the sample being de-banded.

1.6.2. De-Banding by Random Sampling

Figure 15:
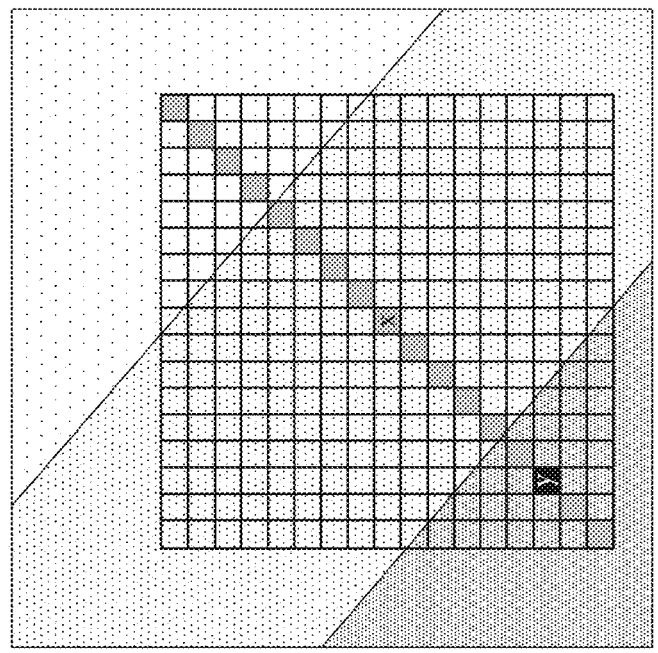
FIG. 15 illustrates exemplary application of dither by random sampling according to an aspect of the present disclosure.

In one embodiment, a low-complexity de-banding approach may be applied based on random sampling. FIG. 15, for example, illustrates an example where the current pixel being filtered (de-banded) is denoted by x, $d_{opt}^\perp=45°$, and L=8. In this embodiment, a codec randomly selects a sample, denoted as y in FIG. 15, from the support region of $d_{opt}^\perp$. First, y may be clipped to [x−∈, x+∈] and the current pixel may be replaced by the clipped value, where ∈ may be an arbitrary number that could be set small to maintain continuity of pixel values around the current pixel.

In one embodiment, random sampling may be performed from the support region for $d_{opt}^\perp=45°$ line to replace x, where random sampling frequency may be favored to samples further away from x along the $d_{opt}^\perp=45°$ line. In general, a location where to sample within the support region of $d_{opt}^{\perp}=45°$ line can be constrained.

Figure 16:
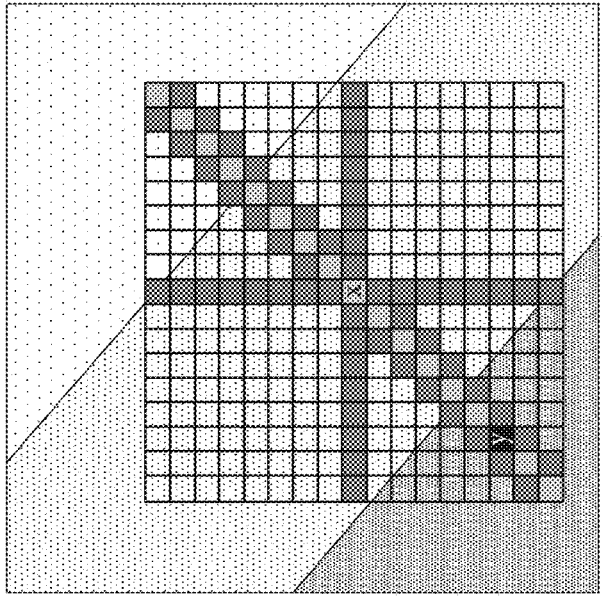
FIG. 16 illustrates exemplary application of dither by random sampling according to another aspect of the present disclosure.
Figure 17:
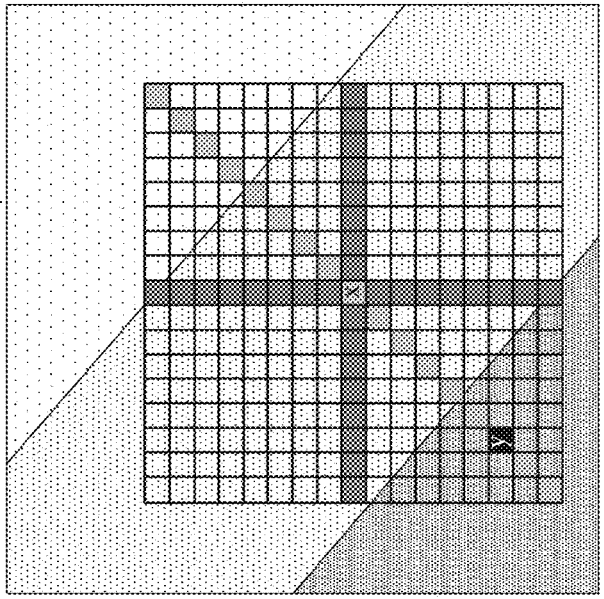
FIG. 17 illustrates exemplary application of dither by random sampling according to a further aspect of the present disclosure.

In one example, a spatially wider support region may be used for sampling. In another example, more than one sample may be selected and the mean, median or any other statistics may be used to replace x. In one more example, the clipping range [x−∈, x+∈] may be selected, e.g., according to QP or based on the information of the current block. A value of ∈=1 is typically good enough. FIG. 16 and FIG. 17 show examples of the use of support regions in different shapes and sizes.

1.6.3. Signaling

In one embodiment, all the parameters introduced above in sections 1.6.1 and 1.6.2 may be signaled between codecs in the bit stream at the sequence level, frame level, and filter block level. A codec may signal a flag debanding_type to indicate whether interpolation or random sampling is used for de-banding. Likewise, L and ∈ may be signaled at any level. In one example, a fixed set of values may be used for the entire sequence and signaled in the bit stream. In another example, different values may be signaled for each frame or group of frames. In another example, different values may be signaled for each filter block to have a finer control over the de-banding level. Predictive coding may also be used to predict values of any of these syntax elements from the ones used by the neighboring blocks, and entropy coding may be used to code the difference between the predicted values and the actual values. In another example, all or a subset of these syntax elements may be derived by QP and not written to the bit stream.

2. De-banding with Gradient Information 2.1. Banding Detection.

This section discloses a banding detector based on the gradient information. Given a block of size M×N in a frame, embodiments of the present disclosure may detect whether a block potentially has banding/contour artifacts or not.

Figure 18:
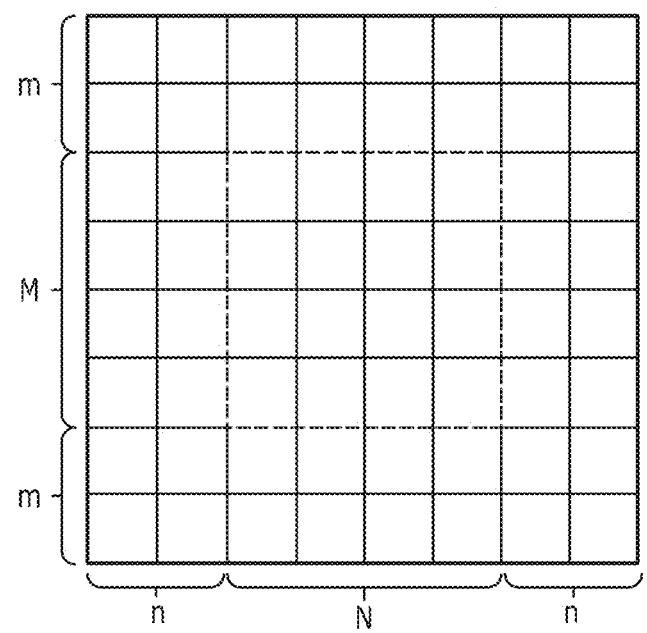
FIG. 18 illustrates exemplary reference samples used for banding detection according to an aspect of the present disclosure.

2.1.1. Reference Samples for Banding Detection:

The reference samples to detect banding may include the samples in the current block and its neighbor samples. The reference window size may be (M+2×m)×(N+2×n) where m and n are positive integer numbers as depicted in FIG. 18.

Figure 19:
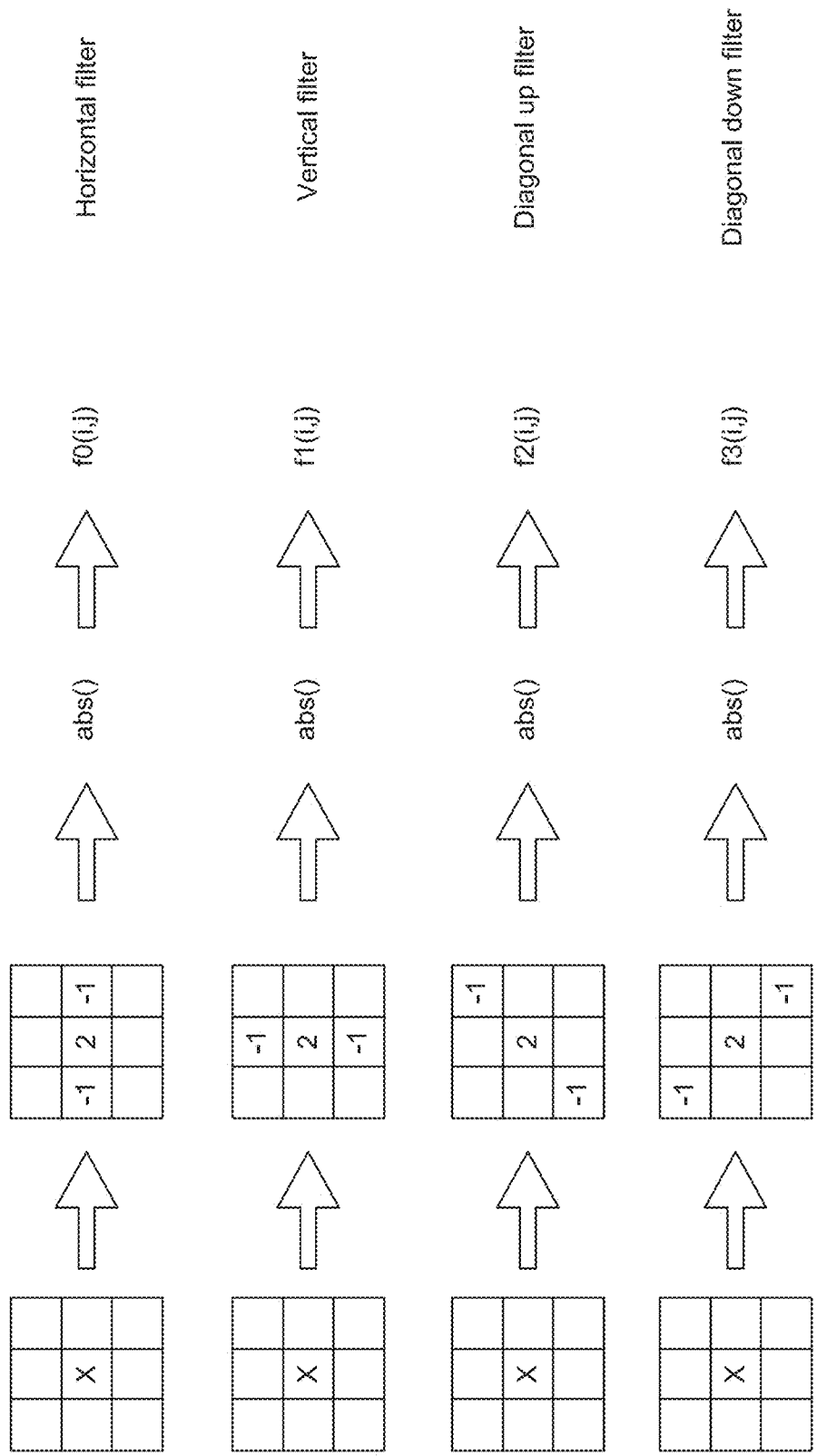
FIG. 19 illustrates exemplary application of a gradient filter according to an aspect of the present disclosure.

2.1.2. Gradient Feature for Banding Detection:

A gradient filter can be applied on each sample through the reference block excluding the border samples in different directions as depicted in FIG. 19. In one example, the filter coefficient of the gradient filter may be [−1, 2, −1]. The input-output formular of the filter is given as:

$$f_k(i, j) = \text{abs}(x(i, j) - x_{1k} + x(i, j) - x_{2k})$$

where k is the $k^{th}$ gradient direction, x(i, j) represents the sample value at position (i, j) in the reference block, $x_{1k}$ and $x_{2k}$ are the two neighbor samples of x(i, j) in the $k^{th}$ direction, abs(X) is the absolute function which returns the magnitude of X.

For each direction, a gradient block with the size of (M+2×m−2)×(N+2×n−2) may be formed including the gradient filtered samples in this direction.

2.1.3. Banding Detection Based on the Gradient Feature

Each sample in the reference block may be marked as "potential banding" along the $k^{th}$ direction if the corresponding gradient in the gradient block is smaller than a threshold $T_p$. In one embodiment, the banding detection may use the number of samples marked as "potential banding" to evaluate the banding of a block. In one example, the number of gradient samples which are smaller than $T_p$ in all the direction blocks is derived. If this number is greater than a threshold $T_s$, the block is evaluated as "potential banding." This example of the detection rule can be expressed as follows:

$$B_{band} = \sum_k \sum_{i,j} BP_k(i, j) > T_s$$

where $B_{band}$ indicates whether the block has banding or not, $BP_k(i, j)$ is 1 if the gradient sample at the position (i, j) in the gradient block corresponding to the $k^{th}$ direction is smaller than $T_p$. Otherwise, $BP_k(i, j)$ is set equal to 0.

In another embodiment, additional side information may be used to support the banding detection. Such information may include the mean and/or the variance of the samples in the current blocks. In one example, a block may be considered as "potential banding" if it is marked as "potential banding" by using the gradient information and the variance of the block is less than a threshold $T_v$.

2.1.4. Banding Edge Detection Based on the Gradient Feature:

Based on the gradient values in each gradient block, this embodiment may employ a technique to estimate the banding edge of a banding block. The banding edge may be used to support the de-banding step.

In one embodiment, the sum of the gradient values in the gradient blocks may be used to detect the banding edge. Among the k directions, the direction corresponding to the minimal summation of gradient samples may be decided as banding edge. The estimated rule may be expressed as follows:

$$e = \underset{k}{\text{argmin}} \sum_{i,j} G_k(i, j)$$

where e is the estimated banding edge, $G_k(i, j)$ represents the gradient value at the position (i, j) of the gradient block corresponding to the $k^{th}$ direction.

In one example, if all summations of the gradient block are identical, the estimated banding edge may be assigned to be the pre-defined default edge which is one of the available edges. The default mode may be set to be a diagonal direction. Or it may be the edge of a neighbour block. In another example, the default mode can be randomly selected from the neighbor blocks.

Figure 20:
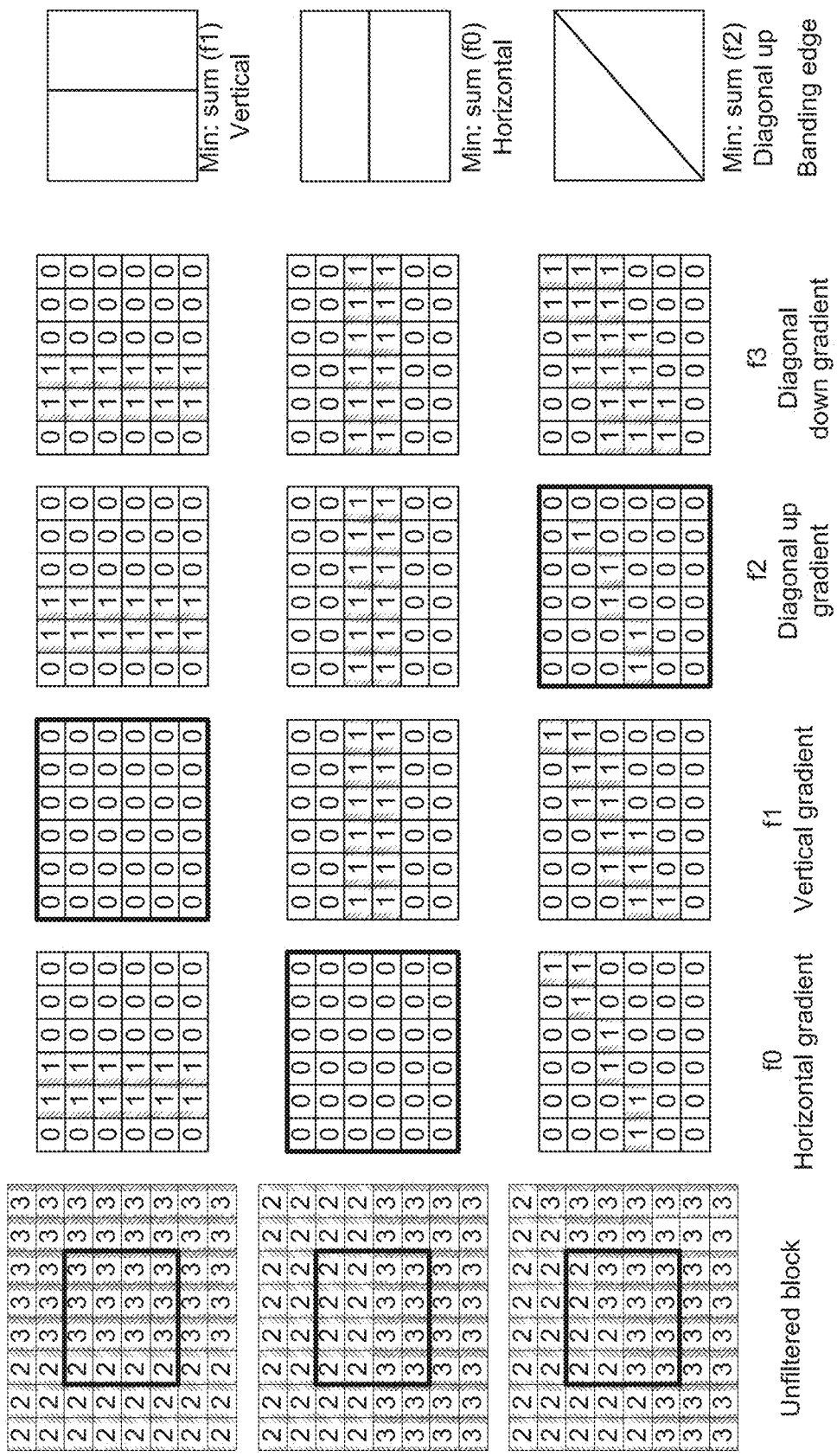
FIG. 20 illustrates examples of banding and banding edge detection using gradient information according to an aspect of the present disclosure.
Figure 21:
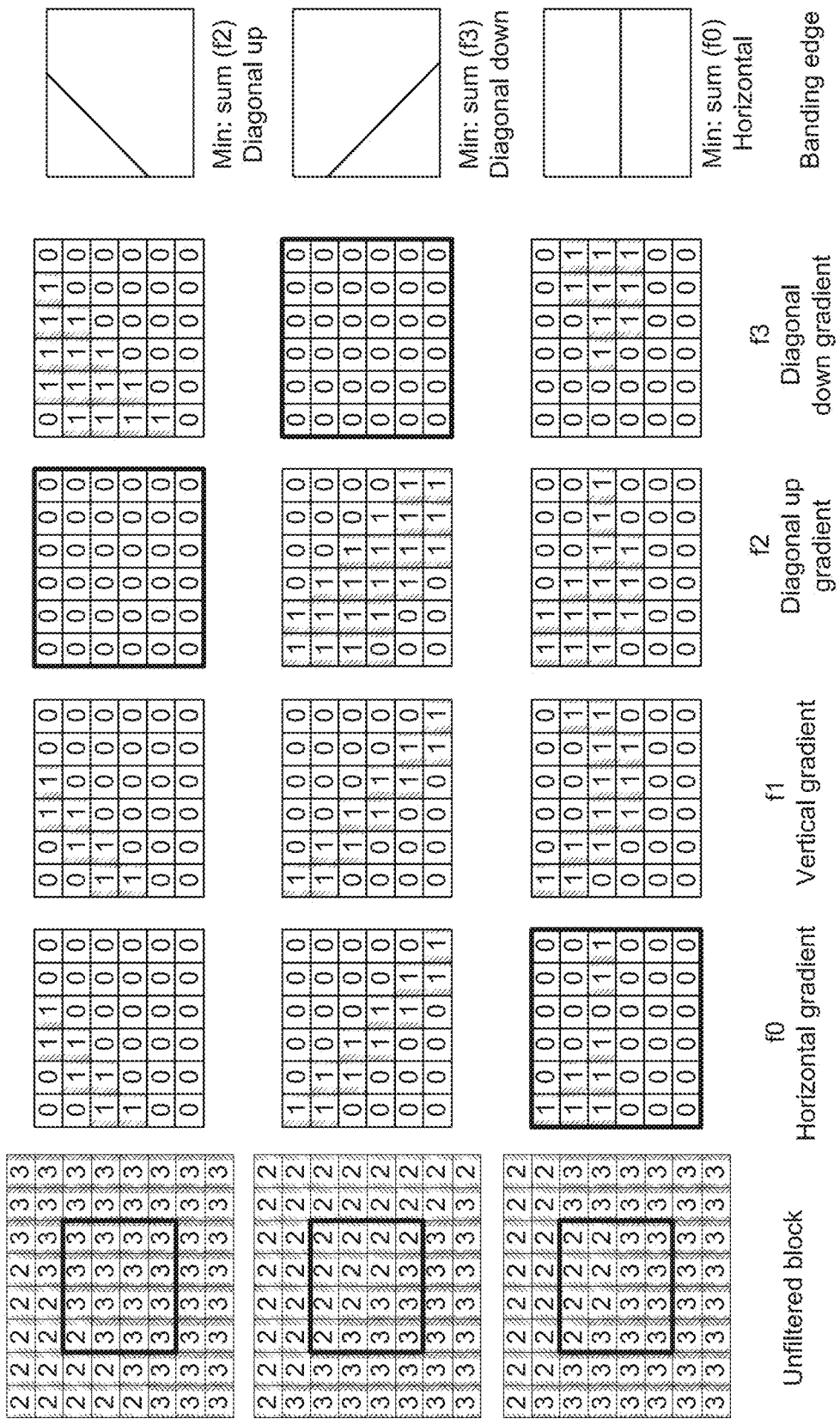
FIG. 21 illustrates examples of banding and banding edge detection using gradient information according to another aspect of the present disclosure.

FIGS. 20 and 21 illustrate multiple examples on the performance of the proposed banding and banding edge detection methods using the gradient information. In the 4×4 input blocks, banding appears in different directions. The difference between two consecutive bands is just "1". The reference window size is 8×8 while the gradient block size is 6×6. It can be seen from the figures that the values in the gradient block are almost 0 or 1. With a threshold $T_p$ of 2 and $T_s$ of 120, the proposed technique is able to detect all the banding cases.

2.1.5. Banding Edge Detection Based on the Summation of Gradient Sample:

In one embodiment, the edge of the block may be detected first using the example discussed above in [0102]. Then banding may be detected using a summation of the gradient of this edge and the direction m which has the maximum summation of the gradient. This direction may be derived as follows:

$$m = \underset{k}{\mathrm{argmax}} \sum_{i,j} G_k(i, j)$$

where m is the direction which has the maximum of summation of gradients, $G_k(i, j)$ represents the gradient value at the position (i, j) of the gradient block corresponding to the $k^{th}$ direction.

In another embodiment, the direction m may be set equal to direction which is orthogonal the edge e of the block.

Using the block edge e and the direction m which has the maximum summation of gradient samples, the banding artifact of the block may be detected using the following equation.

$$\mathrm{is\_banded} = \sum_{i,j} G_e(i, j) < T_1 \ \&\& \ \sum_{i,j} G_m(i, j) < T_2$$

where T1 and T2 are the predefined numbers.

2.2. Banding Removal

When a banding artifact is detected in a block, the quality of the block may be improved by applying de-banding operations, which may be filtering, dithering and/or randomized operations, to remove or reduce that artifact. This invention proposes several techniques aiming at mitigating such artifacts. The introduced de-banding techniques can be classified into two directions including a low-pass filter with dithering and random subsampling of the reference samples.

2.2.1. Banding Removal by Jointly Low-Pass Filter and Dithering

This invention discloses methods to mitigate the banding artifact of an M×N block using a low-pass filter incorporated with a dithering step. A low-pass filter may use the samples in the current block and its neighbour samples as input. The sum of the input samples is derived. The filtered value of each sample in the current block may derived by adding a random noise value to the sum then dividing the result by the number of the input samples. The de-banding process may be expressed as follows:

$$f(m, n) = \left\{ \sum_{i,j} P(i, j) + N(m, n) \right\} / C$$

where f(m, n) represents the de-banded sample at the position (m, n) of the current block, P(i, j) is the pre-debanded sample at the position (i, j) in the input block of the filter, N(m, n) is the added noise value, and C is the number of input samples.

Figure 22:
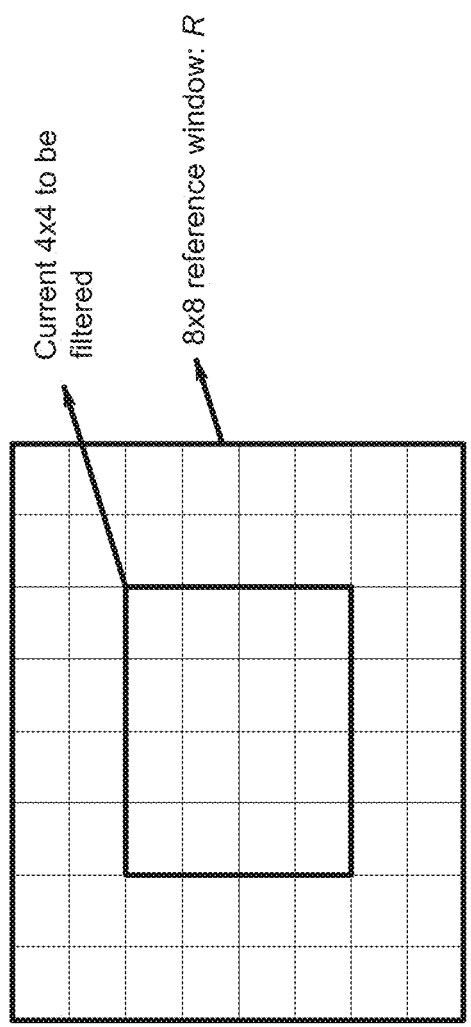
FIG. 22 illustrates relationships between a block to be filtered and a reference block according to an aspect of the present disclosure.

In one example, the processing unit for de-banding is set equal to 4 and the input block for the filter is 8×8 as illustrated in FIG. 22, the de-banding filter formular may be expressed as:

$$f(m, n) = \left\{ \sum_{i,j} P(i, j) + N(m, n) \right\} \gg 6$$

where N(m, n) may be constrained to be in the range from 0 to 63.

To align the random noisy term N(m, n) of the encoder and decoder, a pre-defined randomly generated set may be made available in both the encoder and decoder. In one example, this set may be generated in the encoder and send to the decoder in a high-level syntax. In another example, this set may be fixed and available in both encoder and decoder. In another example, one or more than one seed value may be signaled to be used in random number (noise) generation or dithering.

In one embodiment, the random value for dithering at the position (m, n) may be derived based on the position of the sample relatively to the frame as follows:

$$N(m, n) = \mathrm{rand\_set}[a \times (m \ \% \ k) + n \ \% \ k]$$

where a and k are positive integer number that satisfy a×k=H where H is the number of elements in the random set rand_set. In one example, a and k may be set equal to 8 and H is set equal to 64.

2.2.2. Banding Removal Using Random Subsampling

In an embodiment, the de-banded value of a sample in a banding block may be set equal to a sample which is randomly picked from a support region of neighbour samples. The support region S may be derived based on the banding edge of the block which may be derived using the technique presented in Section 2.1.

Figure 23:
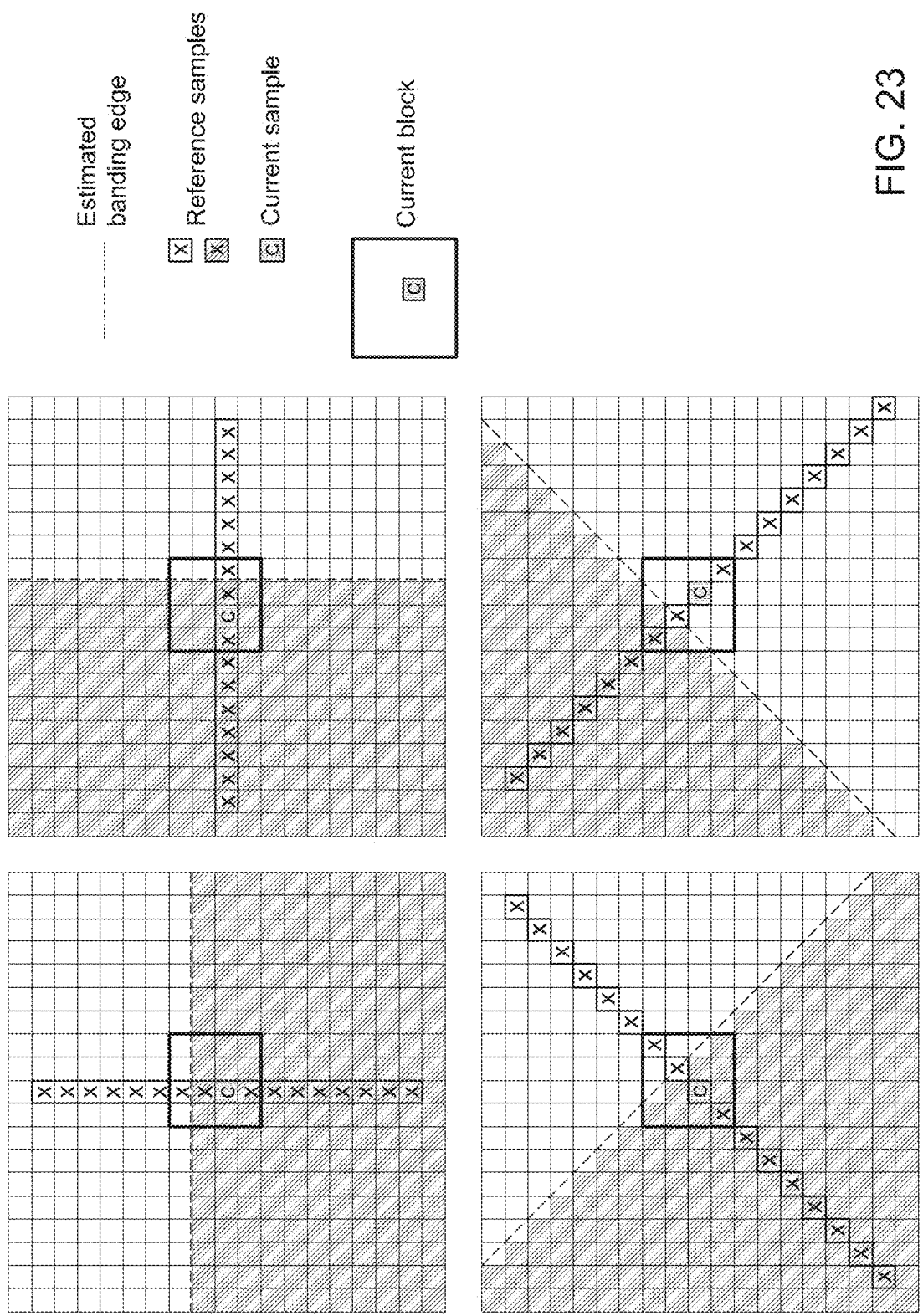
FIG. 23 illustrates exemplary relationships between a source sample and a support region according to an aspect of the present disclosure.

In one embodiment, the support region S may include the samples in a line which is in the orthogonal direction with the banding edge and crossing the current sample. In one example, the support region may include (2×L+1) the samples in the reference line with the center sample of the position of the current sample. In this example, L is a positive integer number which may be signaled in the bitstream or implicitly decided based one or more coding information such as the quantization parameter, coding block size, or the number of non-zero transform coefficients corresponding to the current block. FIG. 23 illustrates an example where the processing unit size is 4×4 and L is 8. In this case the total number of reference points for random selection is 17.

To perform the randomly selection, an index set may be defined where each element is randomly generated. The value of each element in the random set is constrained in the range from 0 to 2×L. One or more than one seed values may be signaled to be used in random number generation to derive randomized subsampling patterns for different block sizes/shapes.

The de-banded value at the position (m, n) may be selected randomly from the support region S based on (m, n) as follows:

$$f(m, n) = S[N(m, n)\mathrm{MOD}(2*L + 1)]$$

where N(m,n) is the function which selects a number from a set of randomly generated numbers for de-banding the sample at the position (m,n). In one example, the selection function may be defined as follows:

$$N(m, n) = \mathrm{rand\_set}[(m*n + m \wedge n)\mathrm{MOD}K]$$

where rand_set is the set of randomly generated numbers in the range from 0 to 2×L. K is the number of elements in rand_set or the length of rand_set.

2.2.3. Banding Removal Using 1D Low-Pass Filter

In an embodiment, a one-dimensional (1D) low-pass filter may be applied together with a dithering part to mitigate the banding artifacts. In one example, the support region S may be used as the input for the filter. The formular of the filter may be expressed as follows:

$$f(i, j) = \left(\sum_{k} F[k] * S_{i,j}[k] + N_{i,j}\right) / C$$

where Si,j presents the support region of the sample at the position of (i,j), Ni,j represents the noise value for filtering the sample (i, j). F is the filter tap values. C is the sum of the elements in F.

In one example with the L of 12, the filter may have 25 taps which can be presented as follows:

$$F=\{1,1,1,1,1,1,1,1,2,1,2,1,4,1,2,1,2,1,1,1,1,1,1,1,1\}$$

In this case, C is equal to 32 and the division in the filtering formular can be replace by a right shift of 5.

2.2.4. Clipping of the De-Banded Value

Since the proposed de-banding techniques use the neighbour samples, artifacts may appear due to the propagation of the value samples from the texture region to current block which is normally smooth. Embodiments of the disclosure may clip the de-banded value f(m, n) to a small range which includes the un-filtered value. One example of clipping may be expressed as follows:

$$f(m, n) = \begin{cases} P(m, n) - \beta & \text{if } f(m, n) < P(m, n) - \beta \\ P(m, n) + \beta & \text{if } f(m, n) > P(m, n) + \beta \\ f(m, n) & \text{otherwise} \end{cases}$$

Another example of clipping may be expressed as follows:

$$f(m, n) = \begin{cases} P(m, n) & \text{if } f(m, n) < P(m, n) - \beta \text{ or } f(m, n) > P(m, n) + \beta \\ f(m, n) & \text{otherwise} \end{cases}$$

In the clipping process, the clipping strength β may be signaled in the bitstream or it may be implicitly derived using coding information such as quantization parameters. For example, a higher β may be used for higher QP or bitrate coding cases.

3. Other Embodiments

3.1. Out-Loop or a Standalone De-Banding Tool

In one embodiment, the proposed banding detections and de-banding filters may be applied as a standalone tool which means it can be applied on the decoded frame of any video/image codecs.

Figure 24:
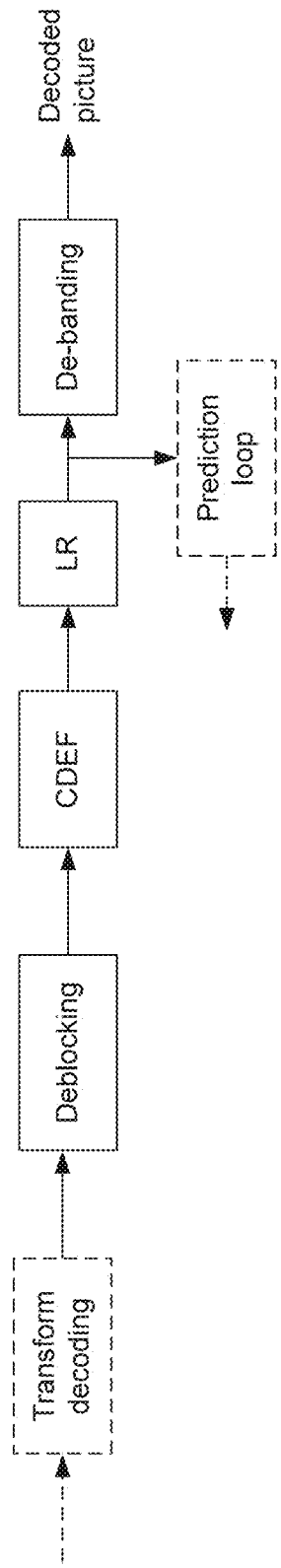
FIG. 24 illustrates exemplary relationships between a debanding filter and other filter components of an in-loop filter system according to an aspect of the present disclosure.

In another embodiment, the proposed techniques may be applied as a post-loop tool of AVM. The de-banding process may be implemented after the last stage of the in-loop filters, i.e., loop restoration. The output of the de-banding process may be not used in the prediction loop as illustrated in FIG. 24.

In one example, a flag may be signaled in the bitstream in frame level to indicate whether this frame is to be de-banded or not.

In another example, a frame level banding detection may be applied to the decoded picture to decide whether the frame is to be de-banded or not.

In another embodiment, banding detection may utilize/reuse the hardware design of existing codecs to get the necessary information for the detection. For example, the information may be the gradient information as presented in Section 2.1. In this case, the directional feature calculation block in the PC-Wiener loop restoration mode may be reused.

3.2. In-Loop De-Banding Tool in AVM 3.2.1. De-Banding Filter as a New Loop Restoration Mode:

In a further embodiment, an additional loop restoration mode named RESTORE_DEBAND may be proposed to mitigate the banding artifact. For the filtering process of a RESTORE_DEBAND restoration unit, the banding detections and de-banding filters presented in Section 2.1 and Section 2.1.5 may be applied for each 4×4 block through the unit. It is noted that the new mode may reuse the hardware block of directional feature derivation in RESTORE_WIENER_PC for the banding detection purpose. In other words, there is free hardware cost for the banding detection.

In one embodiment, a frame may be filtered using single tool frame mode of RESTORE_DEBAND. For example, every loop restoration unit in the frame may be forced to be RESTORE_DEBAND. In that case, the restoration mode for each RU is not signaled in the bitstream and implicitly derived as RESTORE_DEBAND. In another example, the mode of a RU in the single RESTORE_DEBAND frame may be switched between RESTORE_DEBAND and RESTORE_NONE. In a further example, 4×4 block in the RESTORE_DEBAND RU may be filtered using de-banding filter if it is detected as banding block. Otherwise, PC-Wiener filter may be applied for this block.

In another embodiment, a frame may be filtered using switchable tool frame with an addition option of RESTORE_DEBAND. For example, an encoder may first check if an RU has banding or not. One simple method is that encoder may count the number of 4×4 banding block (detected using the proposed method presented in Section 2.1). If that number is higher than a threshold (e.g., if it higher than 10% number of 4×4 block is the RU), the RU may be forced to be RESTORE_DEBAND mode. Otherwise, a rate-distortion process may be used to select the best restoration mode for this RU.

In another embodiment, the banding detection and banding removal may be performed after the loop restoration stage. In this scheme, the PC-Wiener mode may be disable for the banding frames. With this restriction, the gradient filter block in PC-Wiener mode may be reused for banding detection.

3.2.2. RESTORE_WIENER_PC Based De-Banding:

In an embodiment, besides the loop restoration function using a non-separable Wiener filter, RESTORE_WIENER_PC may provide an additional functionality of de-banding. If it is used as de-banding filter, the detection using the gradient information and the de-banding filter as presented in Section 2.1 and Section 2.1.5 may be used for each 4×4 through the RU. Otherwise, the Wiener filter may be used. The use of de-banding or Wiener filter may be based on a high-level syntax flag at frame level or tile level. An encoder may test if the reconstructed frame before the loop restoration has banding or not and decide the value of the high-level syntax and send it in the bitstream. At the decoder side, the flag may be decoded before loop restoration. If the flag is enabled, the de-banding filter may be used for any RESTORE_WIENER_PC RUs in the frame. Otherwise, the Wiener filter may be used for any RESTORE_WIENER_PC RUs.

4. Extending the Gradient Based Approach to Other Codecs

The VVC standard and its successor ECM, currently under the development by MPEG, support an in-loop filter tool named ALF (adaptive loop filter). In the ALF filtering process, the gradient information in 4 directions including horizontal, vertical, diagonal up and diagonal down are calculated to support the filter selection for each 4×4 block.

In one embodiment, the proposed de-banding techniques presented in Section 2 may be applied into these codecs, i.e., VVC and ECM. For example, the proposed filter may be applied as a post-loop filter after the last filtering stage of the codec. The design of the gradient calculation block may be utilized for banding detection which is presented in Section 2.1. Then, the proposed techniques in Section 2.1.5 may be applied to the reconstructed frame.

In another example, the proposed de-banding solutions may be applied as an additional function of ALF. During the ALF filtering process of each 4×4 block, the gradient information is used to detect whether a 4×4 block contains banding artifacts or not. The detection may use the proposed techniques presented in Section 2.1. If it is detected as banding, the proposed method in Section 2.1.5 may be applied. Otherwise, the regular ALF process may be used to filter for this 4×4 block.

In a further example, signaled parameters associated with ALF can be modified based on the encoder decisions to minimize banding artifacts.

5. Harmonization of Gradient Based and CDEF Based Approaches

5.1. Post-Loop De-Banding Approach

In the post-loop de-banding approach, the foregoing embodiments using CDEF information (Section 1) and the proposed method using gradient information (Section 2) may be harmonized as follows:

The detection of banding and banding edge may use the CDEF information or using the gradient calculation as proposed in Section 2.1. The use of either CDEF information and the gradient information may be based on the availability of CDEF or the support of codec. For example, when the CDEF is enabled in the codec, the CDEF information may be use for banding detection. In another example, when the CDEF is not available, e. g., CDEF is not supported in some codec, or CDEF is turn off, the gradient based detection may be used since it requires less power consumption and low complexity.

Instead of detecting the banding based on 8 directions as in CDEF in AVM, the banding detection may estimate the banding using only 4 directions including vertical, horizontal, diagonal up, and diagonal down which align with the direction proposed in Section 2 using the gradient information.

Since CDEF works at 8×8 units, the gradient detection and filter proposed in Section 2 may need to work at 8×8 level. The de-banding filter may use one of the embodiments proposed in Section 2.1.5 and Section 1.6.

5.2. Post-Loop De-Banding Approach

For the in-loop de-banding approach, the proposed method based on CDEF (Section 1) and the proposed method using gradient information (Section 2) may be implemented in the codec. In one example, the selection of the de-banding approach may be signaled in a high-level syntax.

In another example, the selection of the de-banding method may be implicitly based on the activation of CDEF or RESTORE_WIENER_PC. If both these tools are activated, the high-level syntax flag may be used to decide which approach is used. Otherwise, if CDEF is activated, the proposed method using CDEF may be used. Otherwise, the disclosed method based on RESTORE_WIENER_PC may be used.

Figure 28:
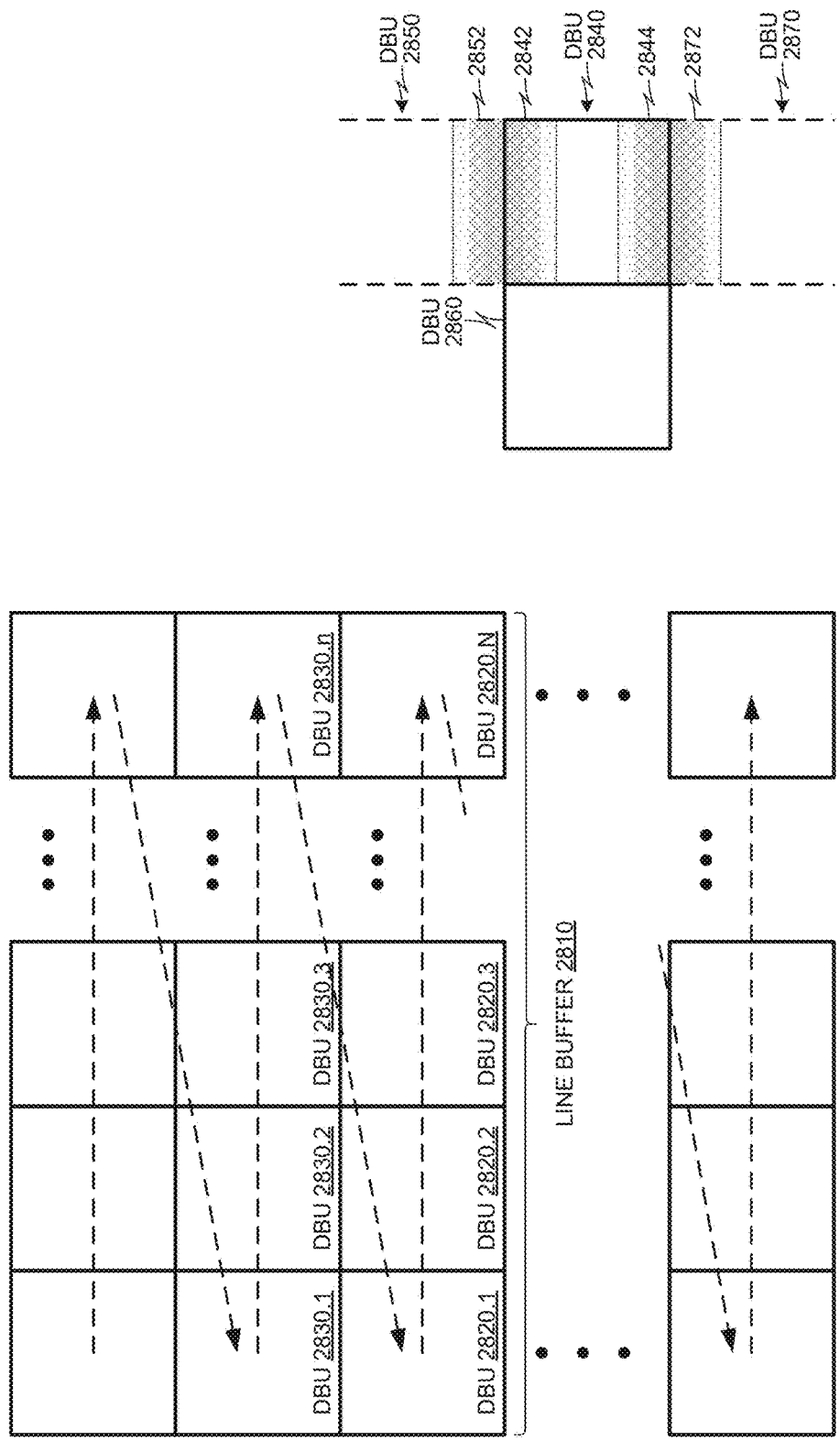
FIG. 28 illustrates exemplary application of interpolation processing to debanding units according to an aspect of the present disclosure.

In an embodiment, deband processing may be performed using extrapolated data that represents image content of neighboring blocks, which may lead to increased resource efficiency in processing devices. FIG. 28 illustrates an exemplary frame 2800 to which this embodiment may be applied. As shown, the frame 2800 includes a plurality of deblocking units ("DBUs"), including DBUs 2820.1-2820.n and 2830.1-2830.n as shown. Many processing devices read image data from memory in predetermined increments according to their local operating constraints. The example of FIG. 28 shows that DBUs 2820.1-2820.n are members of a common line buffer 2810. For purposes of discussion, it may be presumed that a processing device may read and process data of the DBUs 2820.1-2820.n that belong to the line buffer 2810 but the processing device cannot read data of other DBUs (for example, the DUBs 2830.1-2830.n) without incurring the expense of a memory access.

According to an embodiment, debanding operations that require frame content that falls outside a current line buffer 2810 may develop extrapolated content from data of the line buffer itself 2810. FIG. 28 illustrates an example with respect to DBU 2840. In this example, it may be assumed that debanding processing of DBU 2840 requires content from a neighboring block above DBU 2840, labeled DBU 2850 in FIG. 28. In this circumstance, rather than incurring a memory access to retrieve content of DBU 2850, a processor may generate extrapolated content 2852 of DBU 2850 using content already contained in the line buffer. In one example, data from a region 2842 for the DBU may be reused as content of the DBU 2850. The reuse operation may be performed as a copy operation, a mirroring operation (in which case image content is "flipped" around an edge between the DBU 2840 and the region 2852 of DBU 2850 from which debanding processing is to be used), or folding. Content from the region 2842 may be filtered, interleaved or randomized as it is placed in the region 2852 occupied by DBU 2850.

In some implementations, the reconstruction of the encoded frames and the debanding process may be performed in parallel. In these cases, the data below a current DBU may not be available. The extrapolation techniques discussed above also may be applied to generate content for the below neighbour block to support the debanding. FIG. 28 illustrates an example with respect to DBU 2840. In this example, it may be assumed that debanding processing of DBU 2840 requires content from a neighboring block below DBU 2840, labeled DBU 2870 in FIG. 28. In this circumstance, rather than incurring a memory access to retrieve content of DBU 2870, a processor may generate extrapolated content of DBU 2870 using content already contained in the line buffer. In one example, data for a region 2844 of DBU 2840 may be copied and used as content of the DBU 2870. The copy operation may be performed as a copy operation, a mirroring operation (in which case image content is "flipped" around an edge between the DBU 2840 and the region of DBU 2870 from which debanding processing is to be used), folding. Content from the region 2870 may be filtered, interleaved or randomized as it is placed in the region 2872 occupied by DBU 2870.

It is expected that the most common application of content interpolation will be for content above DBUs being processed according to deband processing. Because memory accesses operate in line buffer units that are sized to accommodate multiple DBUs in a common row of a frame, content of a horizontally adjacent DBU 2860 will be available to a processor when performing deband processing for a DBU 2840 within the line buffer. These techniques also may be applied to extrapolate data across a side edge of a DBU (not shown) to accommodate scenarios where a line buffer does not align with a DBU (say DBU 2830.1) on a frame edge. In this circumstance, content neighboring a very first DBU of a line buffer may not be available to the processor without a memory access.

Figure 25:
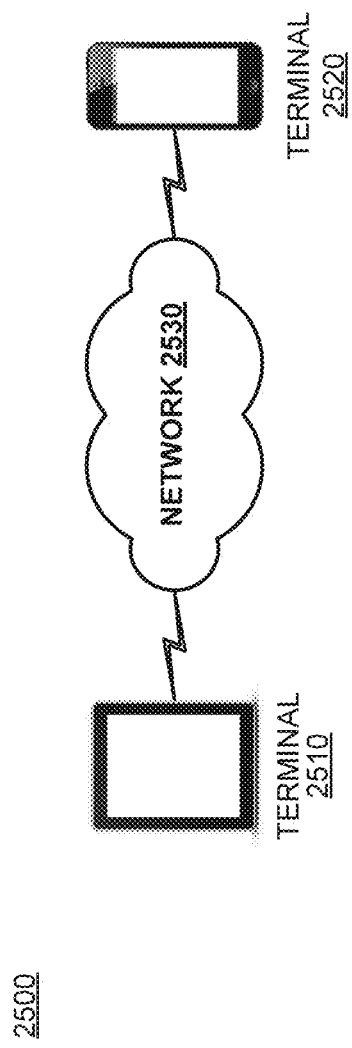
FIG. 25 illustrates a video exchange system according to an aspect of the present disclosure.

FIG. 25 illustrates a video exchange system 2500 according to an aspect of the present disclosure. The system 2500 may include two or more terminals 2510, 2520 that may exchange video data across a communication network 2530. Video data generated at a first terminal 2510 may be compressed according to video coding processes which reduce the video's bandwidth and may be transmitted to other terminal 2520 for decoding and consumption. In the simplified diagram illustrated in FIG. 25, a first terminal 2510 may send the video to a second terminal 2520. In other applications, however, the first terminal 2510 may send the video to multiple terminals (not shown) for consumption in parallel. Moreover, other applications may involve multidirectional exchange of video where, for example, the second terminal 2520 may generate its own video data, compress it, and send it to the first terminal 2510 for consumption. The principles of the present discussion find application in all such use cases.

In the example of FIG. 25, the terminals 2510, 2520 are illustrated as tablet computers and smartphones, respectively. The principles of the present disclosure may find applications for a diverse array of terminal devices, including for example, computer services, personal computers, desktop computer, laptop computers, personal media devices, set top devices, and media players. The type of terminal device is immaterial to the present discussion unless noted otherwise herein.

Moreover, the principles of the present disclosure may find applications with a wide variety of networks 2530. Such networks 2530 may include packet-switched and circuit-switched networks, wired and wireless networks, and computer and communications networks. The architecture and topology of the network 2530 is immaterial to the present discussion unless noted otherwise herein.

Figure 26:
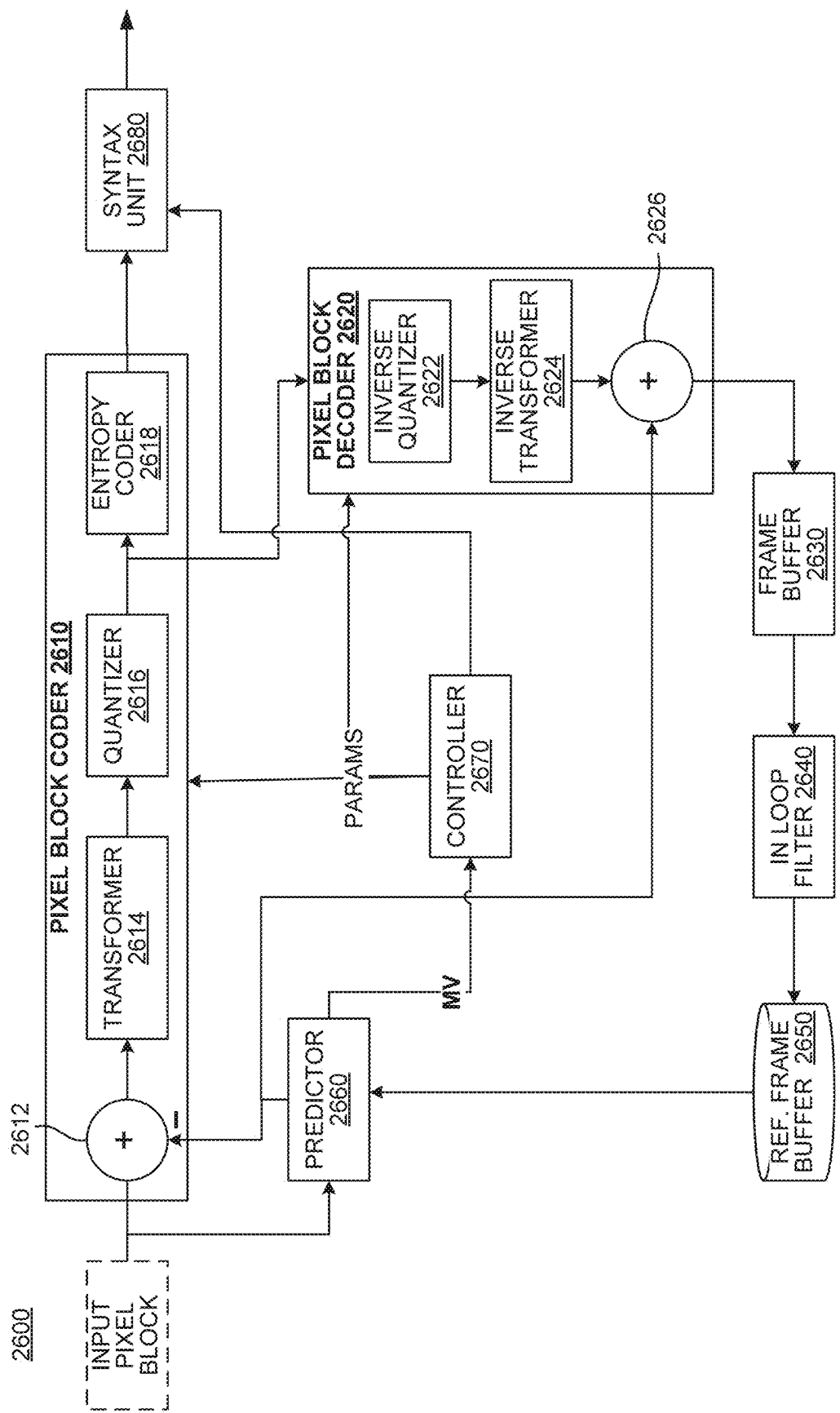
FIG. 26 is a functional block diagram of a video coder according to an aspect of the present disclosure.

FIG. 26 is a functional block diagram of a video coder 2600 according to an aspect of the present disclosure. The system 2600 may include a pixel block coder 2610, a pixel block decoder 2620, a frame buffer 2630, an in-loop filter system 2640, a reference frame buffer 2650, a predictor 2660, a controller 2670, and a syntax unit 2680.

The pixel block coder 2610 and the predictor 2660 may receive data of an input pixel block. The predictor 2660 may generate prediction data for the input pixel block and input it to the pixel block coder 2610. The pixel block coder 2610 may code the input pixel block differentially with respect to the predicted pixel block output coded pixel block data to the syntax unit 2680. The pixel block decoder 2620 may decode the coded pixel block data, also using the predicted pixel block data from the predictor 2660, and may generate decoded pixel block data therefrom.

The frame buffer 2630 may generate reconstructed frame data from decoded pixel block data. The in-loop filter 2640 may perform one or more filtering operations on the reconstructed frame. The in-loop filter system 2640 may employ debanding filtering operations as discussed hereinabove either singly or in cooperation with other filtering subsystems such as deblocking filtering, sample adaptive offset (SAO) filtering, adaptive loop filtering (ALF), maximum likelihood (ML) based filtering schemes, deringing filtering, sharpening filtering, resolution scaling, and the like. Selections of debanding filtering properties may be made by the controller 2670, which may cause the controller 2670 to supply filtering parameters in a coded output of the system 2600.

The reference frame buffer 2650 may store the filtered frame, where it may be used as a source of prediction of later-received pixel blocks. The syntax unit 2680 may assemble a data stream from the coded pixel block data, which conforms to a governing coding protocol.

The pixel block coder 2610 may include a subtractor 2612, a transform unit 2614, a quantizer 2616, and an entropy coder 2618. The pixel block coder 2610 may accept pixel blocks of input data at the subtractor 2612. The subtractor 2612 may receive predicted pixel blocks from the predictor 2660 and generate an array of pixel residuals therefrom representing a difference between the input pixel block and the predicted pixel block. The transform unit 2614 may apply a transform to the sample data output from the subtractor 2612, to convert data from the pixel domain to a domain of transform coefficients. The quantizer 2616 may perform quantization of transform coefficients output by the transform unit 2614. The quantizer 2616 may be a uniform or a non-uniform quantizer. The entropy coder 2618 may reduce bandwidth of the output of the coefficient quantizer by coding the output, for example, by variable length code words or using a context adaptive binary arithmetic coder.

The transform unit 2614 may operate in a variety of transform modes as determined by the controller 2670. For example, the transform unit 2614 may apply a discrete cosine transform (DCT), a discrete sine transform (DST), a Walsh-Hadamard transform, a Haar transform, a Daubechies wavelet transform, or the like. In an aspect, the controller 2670 may select a coding mode M to be applied by the transform unit 2614, may configure the transform unit 2614 accordingly and may signal the coding mode M in the coded video data, either expressly or impliedly.

The quantizer 2616 may operate according to a quantization parameter QP that is supplied by the controller 2670. In an aspect, the quantization parameter QP may be applied to the transform coefficients as a multi-value quantization parameter, which may vary, for example, across different coefficient locations within a transform-domain pixel block. Thus, the quantization parameter QP may be provided as a quantization parameters array.

The entropy coder 2618, as its name implies, may perform entropy coding of data output from the quantizer 2616. For example, the entropy coder 2618 may perform run length coding, Huffman coding, Golomb coding, Context Adaptive Binary Arithmetic Coding, and the like.

The pixel block decoder 2620 may invert coding operations of the pixel block coder 2610. For example, the pixel block decoder 2620 may include a dequantizer 2622, an inverse transform unit 2624, and an adder 2626. The pixel block decoder 2620 may take its input data from an output of the quantizer 2616. Although permissible, the pixel block decoder 2620 need not perform entropy decoding of entropy-coded data since entropy coding is a lossless event. The dequantizer 2622 may invert operations of the quantizer 2616 of the pixel block coder 2610. The dequantizer 2622 may perform uniform or non-uniform de-quantization as specified by the decoded signal QP. Similarly, the inverse transform unit 2624 may invert operations of the transform unit 2614. The dequantizer 2622 and the inverse transform unit 2624 may use the same quantization parameters QP and transform mode M as their counterparts in the pixel block coder 2610. Quantization operations likely will truncate data in various respects and, therefore, data recovered by the dequantizer 2622 likely will possess coding errors when compared to the data presented to the quantizer 2616 in the pixel block coder 2610.

The adder 2626 may invert operations performed by the subtractor 2612. It may receive the same prediction pixel block from the predictor 2660 that the subtractor 2612 used in generating residual signals. The adder 2626 may add the prediction pixel block to reconstructed residual values output by the inverse transform unit 2624 and may output reconstructed pixel block data.

As described, the frame buffer 2630 may assemble a reconstructed frame from the output of the pixel block decoders 2620. The in-loop filter 2640 may perform various filtering operations on recovered pixel block data. For example, the in-loop filter 2640 may include a deblocking filter, a sample adaptive offset ("SAO") filter, and/or other types of in-loop filters (not shown).

The reference frame buffer 2650 may store filtered frame data for use in later predictions of other pixel blocks. Different types of prediction data are made available to the predictor 2660 for different prediction modes. For example, for an input pixel block, intra prediction takes a prediction reference from decoded data of the same frame in which the input pixel block is located. Thus, the reference frame buffer 2650 may store decoded pixel block data of each frame as it is coded. For the same input pixel block, inter prediction may take a prediction reference from previously coded and decoded frame(s) that are designated as reference frame. Thus, the reference frame buffer 2650 may store these decoded reference frames.

The controller 2670 may control overall operation of the coding system 2600. The controller 2670 may select operational parameters for the pixel block coder 2610 and the predictor 2660 based on analyses of input pixel blocks and also external constraints, such as coding bitrate targets and other operational parameters. As is relevant to the present discussion, when it selects quantization parameters QP, the use of uniform or non-uniform quantizers, and/or the transform mode M, it may provide those parameters to the syntax unit 2680, which may include data representing those parameters in the data stream of coded video data output by the system 2600. The controller 2670 also may select between different modes of operation by which the system may generate reference images and may include metadata identifying the modes selected for each portion of coded data.

During operation, the controller 2670 may revise operational parameters of the quantizer 2616 and the transform unit 2614 at different granularities of image data, either on a per pixel block basis or on a larger granularity (for example, per tile, per slice, per largest coding unit ("LCU") or Coding Tree Unit (CTU), or another region). In an aspect, the quantization parameters may be revised on a per-pixel basis within a coded frame.

Additionally, as discussed, the controller 2670 may control operation of the in-loop filter 2640 and the prediction unit 2660. Such control may include, for the prediction unit 2660, mode selection (lambda, modes to be tested, search windows, distortion strategies, etc.), and, for the in-loop filter 2640, selection of filter parameters, reordering parameters, weighted prediction, etc.

Figure 27:
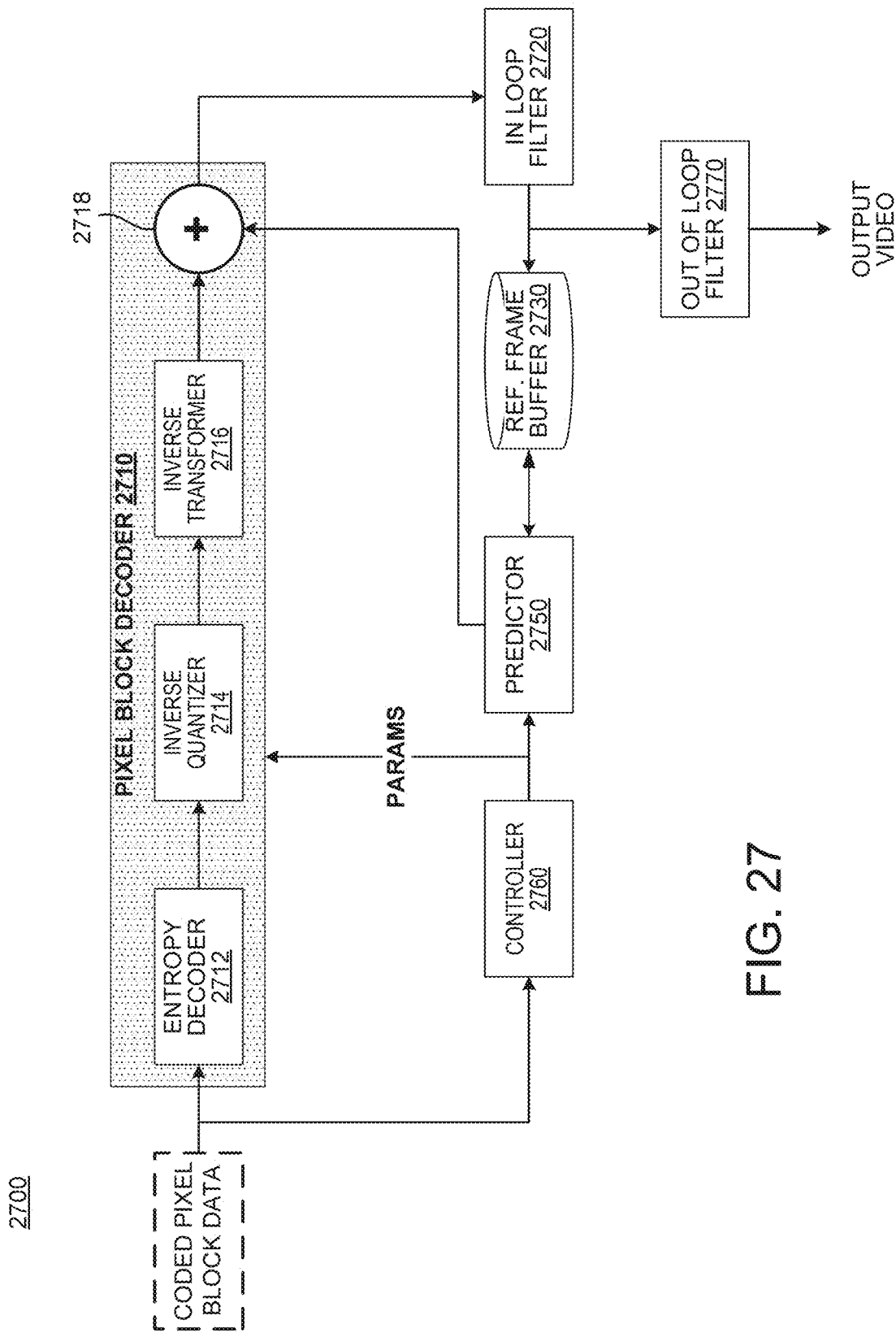
FIG. 27 is a functional block diagram of a decoding system according to an aspect of the present disclosure.

FIG. 27 is a functional block diagram of a decoding system 2700 according to an aspect of the present disclosure. The decoding system 2700 may include a pixel block decoder 2710, an in-loop filter 2720, a reference frame buffer 2730, a predictor 2750, and a controller 2760. The predictor 2750 may receive coding parameters of the coded pixel block from the controller 2760 and supply a prediction block retrieved from the reference frame buffer 2730 according to coding parameter data. The pixel block decoder 2710 may invert coding operations applied by the pixel block coder 2610 (FIG. 26). The in-loop filter 2720 may filter the reconstructed frame data. The filtered frames may be output from the decoding system 2700. Filtered frame that are designated to serve as reference tiles also may be stored in the reference frame buffer 2730.

The pixel block decoder 2710 may include an entropy decoder 2712, an inverse quantizer 2714, an inverse transformer 2716, and an adder 2718. The entropy decoder 2712 may perform entropy decoding to invert processes performed by the entropy coder 2618 (FIG. 26). The inverse quantizer 2714 may invert operations of the quantizer 2616 of the pixel block coder 2610 (FIG. 26). Similarly, the inverse transformer 2716 may invert operations of the transformer 2614 (FIG. 26). They may use the quantization parameters QP and transform modes M that are provided in the coded video data stream. Because quantization is likely to truncate data, the pixel blocks s' recovered by the inverse quantizer 2714, likely will possess coding errors when compared to the input pixel blocks presented to the pixel block coder 2610 of the encoder (FIG. 26).

The adder 2718 may invert operations performed by the subtractor 2610 (FIG. 26). It may receive a prediction pixel block from the predictor 2750 as determined by prediction references in the coded video data stream. The adder 2718 may add the prediction pixel block to reconstructed residual values output by the inverse transform unit 2716 and may output reconstructed pixel block data.

As described, the reference frame buffer 2730 may assemble a reconstructed frame from the output of the pixel block decoder 2710. The in-loop filter 2720 may perform various filtering operations on recovered pixel block data as identified by the coded video data. The in-loop filter 2720 may perform debanding filtering operations as discussed hereinabove either singly or in cooperation with other filtering sub-systems such as deblocking filtering, sample adaptive offset (SAO) filtering, adaptive loop filtering (ALF), maximum likelihood (ML) based filtering schemes, deringing filtering, sharpening filtering, resolution scaling, and the like. The in-loop filter 2720 may operate according to filter selection parameter that the decoding system 2700 receives in coded video data. In this manner, operation of the reference frame buffer 2730 and the in-loop filter 2740 mimics operation of the counterpart frame buffer 2630 and in-loop filter 2640 of the encoder 2600 (FIG. 26).

The reference frame buffer 2730 may store filtered frame data for use in later prediction of other pixel blocks. The reference frame buffer 2730 may store decoded frames as it is coded for use in intra prediction. The reference frame buffer 2730 also may store decoded reference frames.

The controller 2760 may control overall operation of the coding system 2700. The controller 2760 may set operational parameters for the pixel block decoder 2710 and the predictor 2750 based on parameters received in the coded video data stream. As is relevant to the present discussion, these operational parameters may include quantization parameters QP for the dequantizer 2714 and transform modes M for the inverse transform unit 2710. As discussed, the received parameters may be set at various granularities of image data, for example, on a per pixel block basis, a per tile basis, a per slice basis, a per LCU/CTU basis, or based on other types of regions defined for the input image.

Decoded data may be output from the decoding system 2700 for consumption by other units within a receiving terminal (FIG. 25) such as by a display or an application that executes on the terminal. If desired, the system 2700 may include an out of loop filtering system 2770 for output data that is not to be stored in the reference frame buffer 2730. The out of loop filter 2770 may operate as discussed in the foregoing embodiments.

The foregoing discussion has described operation of the aspects of the present disclosure in the context of video codecs—coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically are stored in physical storage media such as electronic-, magnetic-, and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of filtering decoded video data, comprising:
    estimating a directionality of a block of decoded image data according to a directional pattern search,
    applying a directional filter to the block aligned to be orthogonal to the directionality estimated by a directional pattern search.

2. The method of claim 1, wherein the directional pattern search is performed according to a Constrained Directional Enhancement Filter (CDEF) search according to an AOM Video Model.

3. The method of claim 1, wherein the directional pattern search is performed according to a Constrained Directional Enhancement Filter (CDEF) search according to AV1.

4. The method of claim 1, wherein the directional filter is a non-linear filter according to the AOM Video Model.

5. The method of claim 1, wherein the directional filter is a linear filter.

6. The method of claim 1, wherein
    the estimating is performed on a block of a first size, and
    the directional filter is applied to blocks of a second size smaller than the first size.

7. The method of claim 6, wherein the second size is a size of a pixel of the decoded image data.

8. The method of claim 1, wherein the directional filter is applied within a prediction loop of a video coding system.

9. The method of claim 1, wherein the directional filter is applied outside of a prediction loop of a video decoding system.

10. The method of claim 1, wherein the applying includes injecting noise into the output of the directional filter.

11. The method of claim 1, wherein the directional filter applies filtering weights that vary according to a distance from the block being filtered.

12. The method of claim 1, wherein the directional filter includes taps along directions ±45° of the aligned direction.

13. The method of claim 1, wherein the block of decoded image data is generated by a decoder within a video encoder of a video coding system.

14. The method of claim 1, wherein the block of decoded image data is generated by a video decoder of a video coding system.

15. The method of claim 1, wherein the filtering is performed on samples of the block and their neighbor samples.

16. The method of claim 15, wherein the neighbor samples are generated by interpolating the neighbor samples from content of the block.

17. A computer readable medium storing program instructions that, when executed by a processing device, cause the processing device to:
    estimate a directionality of a block of decoded image data according to a directional pattern search,
    apply a directional filter to the block aligned to be orthogonal to the directionality estimated by a directional pattern search.

18. The medium of claim 17, wherein the directional pattern search is performed according to a Constrained Directional Enhancement Filter (CDEF) search according to an AOM Video Model.

19. The medium of claim 17, wherein the directional pattern search is performed according to a Constrained Directional Enhancement Filter (CDEF) search according to AV1.

20. The medium of claim 17, wherein the directional filter is a non-linear filter according to the AOM Video Model.

21. The medium of claim 17, wherein the directional filter is a linear filter.

22. The medium of claim 17, wherein
    the estimating is performed on a block of a first size, and
    the directional filter is applied to blocks of a second size smaller than the first size.

23. The method of claim 22, wherein the second size is a size of a pixel of the decoded image data.

24. The medium of claim 17, wherein the directional filter is applied within a prediction loop of a video coding system.

25. The medium of claim 17, wherein the directional filter is applied outside of a prediction loop of a video decoding system.

26. The medium of claim 17, wherein the applying includes injecting noise into the output of the directional filter.

27. The medium of claim 17, wherein the directional filter applies filtering weights that vary according to a distance from the block being filtered.

28. The medium of claim 17, wherein the directional filter includes taps along directions ±45° of the aligned direction.

29. The medium of claim 17, wherein the block of decoded image data is generated by a decoder within a video encoder of a video coding system.

30. The medium of claim 17, wherein the block of decoded image data is generated by a video decoder of a video coding system.

31. The medium of claim 17, wherein the filtering is performed on samples of the block and their neighbor samples.

32. The medium of claim 31, wherein the neighbor samples are generated by interpolating the neighbor samples from content of the block.

\* \* \* \* \*

UNITED STATES PATENT AND TRADEMARK OFFICE
CERTIFICATE OF CORRECTION

| | | |
|---|---|---|
| PATENT NO. | : 12,375,660 B2 | Page 1 of 1 |
| APPLICATION NO. | : 18/610737 | |
| DATED | : July 29, 2025 | |
| INVENTOR(S) | : Van Luong Pham et al. | |

It is certified that error appears in the above-identified patent and that said Letters Patent is hereby corrected as shown below:

In the Specification

Column 10, Line 9, "The direction $d_{opt}$ is the one that that minimizes $\sigma_d^2$. Since $\sum x^2$ is the same for all" should be --The direction $d_{opt}$ is the one that minimizes $\sigma_d^2$. Since $\sum x^2$ is the same for all--

Column 25, Line 8, "modes M for the inverse transform unit 2710. As discussed," should be --modes M for the inverse transform unit 2716. As discussed,--

In the Claims

In Claim 10, Column 26, Line 24, "injecting noise into the output of the directional filter" should be --injecting noise into an output of the directional filter--

In Claim 26, Column 27, Line 7, "includes injecting noise into the output of directional" should be --injecting noise into an output of directional--

Signed and Sealed this
Second Day of September, 2025

Coke Morgan Stewart
*Acting Director of the United States Patent and Trademark Office*